(12) United States Patent
Lyzenga et al.

(10) Patent No.: US 11,877,583 B2
(45) Date of Patent: Jan. 23, 2024

(54) PACKAGING A COMESTIBLE WITHOUT CONDITIONING

(71) Applicant: INTERCONTINENTAL GREAT BRANDS LLC, East Hanover, NJ (US)

(72) Inventors: Deborah Lyzenga, East Hanover, NJ (US); Bharat Jani, East Hanover, NJ (US); Carlo Businelli, East Hanover, NJ (US); Bhairavi Modak, Parsippany, NJ (US)

(73) Assignee: INTERCONTINENTAL GREAT BRANDS LLC, East Hanover, NJ (US)

( * ) Notice: Subject to any disclaimer, the term of this patent is extended or adjusted under 35 U.S.C. 154(b) by 353 days.

(21) Appl. No.: 16/956,267

(22) PCT Filed: Jan. 4, 2019

(86) PCT No.: PCT/US2019/012342
§ 371 (c)(1),
(2) Date: Jun. 19, 2020

(87) PCT Pub. No.: WO2019/136243
PCT Pub. Date: Jul. 11, 2019

(65) Prior Publication Data
US 2020/0390123 A1    Dec. 17, 2020

Related U.S. Application Data

(60) Provisional application No. 62/614,053, filed on Jan. 5, 2018.

(51) Int. Cl.
*B65B 25/08* (2006.01)
*B65B 35/00* (2006.01)
(Continued)

(52) U.S. Cl.
CPC ............ *A23G 3/0025* (2013.01); *A23G 4/04* (2013.01); *A23G 7/0062* (2013.01);
(Continued)

(58) Field of Classification Search
CPC ..................................................... B65B 9/02
(Continued)

(56) References Cited

U.S. PATENT DOCUMENTS 2,260,780 A    10/1941    Holly
2,757,093 A    7/1956    Starzyk
(Continued)

FOREIGN PATENT DOCUMENTS

CN    101478885 A    7/2009
CN    101786508 A    7/2010
(Continued)

OTHER PUBLICATIONS

International Search Report; International Application No. PCT/US2019/012342; International Filing Date: Jan. 4, 2019; dated Jun. 4, 2019; 8 pages.
(Continued)

*Primary Examiner* — Praachi M Pathak
(74) *Attorney, Agent, or Firm* — CANTOR COLBURN LLP

(57) ABSTRACT

A method of manufacturing a comestible includes providing a comestible mass (22), forming said comestible mass into a comestible structure (26) having a desired shape using a forming station (20), and applying a packaging material (54) to a surface of said comestible structure (26) while said comestible structure remains in contact with a portion of said forming station (20).

19 Claims, 13 Drawing Sheets

(51) Int. Cl.

| | | |
|---|---|---|
| A23G 3/34 | (2006.01) | |
| A23G 4/04 | (2006.01) | |
| A23G 7/00 | (2006.01) | |
| B65B 25/00 | (2006.01) | |
| B65B 35/24 | (2006.01) | |
| B65B 61/06 | (2006.01) | |
| B65B 65/00 | (2006.01) | |

(52) U.S. Cl.
CPC ............ *B65B 25/005* (2013.01); *B65B 25/08* (2013.01); *B65B 35/24* (2013.01); *B65B 61/06* (2013.01); *B65B 65/003* (2013.01)

(58) Field of Classification Search
USPC .................................................. 53/428, 435
See application file for complete search history.

(56) References Cited

U.S. PATENT DOCUMENTS

| | | | | |
|---|---|---|---|---|
| 4,034,536 A | * | 7/1977 | Mahaffy | B65B 31/021 |
| | | | | 53/511 |
| 4,437,294 A | * | 3/1984 | Romagnoli | B65B 29/028 |
| | | | | 53/553 |
| 4,630,426 A | * | 12/1986 | Gentry | B65B 9/04 |
| | | | | 53/546 |
| 4,875,326 A | | 10/1989 | Piano | |
| 4,957,425 A | | 9/1990 | Fay | |
| 5,205,106 A | | 4/1993 | Zimmermann et al. | |
| 5,459,980 A | * | 10/1995 | Kenney | B65B 29/028 |
| | | | | 53/553 |
| 5,562,936 A | | 10/1996 | Song et al. | |
| 5,683,734 A | | 11/1997 | Israel | |
| 5,755,077 A | | 5/1998 | Benham et al. | |
| 5,846,588 A | | 12/1998 | Zimmerman et al. | |
| 5,902,621 A | | 5/1999 | Beckett et al. | |
| 5,935,613 A | | 8/1999 | Benham et al. | |
| 6,254,373 B1 | | 7/2001 | Hoffman et al. | |
| 6,280,780 B1 | | 8/2001 | Degady et al. | |
| 6,284,291 B1 | | 9/2001 | Siecke et al. | |
| 6,574,944 B2 | * | 6/2003 | Capodieci | B29C 65/7443 |
| | | | | 53/DIG. 2 |
| 7,559,185 B2 | * | 7/2009 | Conti | B65B 47/04 |
| | | | | 53/523 |
| 8,590,279 B2 | * | 11/2013 | Van Den Elzen | B65B 35/10 |
| | | | | 53/548 |
| 8,920,856 B2 | | 12/2014 | Aldridge et al. | |
| 9,527,663 B2 | * | 12/2016 | Rivola | B65B 29/028 |
| 10,259,601 B2 | * | 4/2019 | Van Den Elzen | B65B 25/005 |
| 2002/0157355 A1 | * | 10/2002 | Tampieri | B29C 66/131 |
| | | | | 53/559 |
| 2005/0023297 A1 | | 2/2005 | Zill et al. | |
| 2007/0292573 A1 | | 12/2007 | Smith | |
| 2009/0162475 A1 | | 6/2009 | Duggan et al. | |
| 2009/0162476 A1 | | 6/2009 | Duggan et al. | |
| 2010/0055232 A1 | | 3/2010 | Mathisen et al. | |
| 2010/0178382 A1 | | 7/2010 | Olejarski et al. | |
| 2013/0202734 A1 | | 8/2013 | Jani et al. | |
| 2014/0137517 A1 | | 5/2014 | Hammacher et al. | |
| 2014/0302196 A1 | | 10/2014 | Jani et al. | |
| 2016/0008177 A1 | * | 1/2016 | Schmitt | A61F 13/00072 |
| | | | | 53/553 |
| 2016/0227811 A1 | | 8/2016 | Jones et al. | |
| 2017/0156365 A1 | | 6/2017 | Cervenka et al. | |
| 2018/0305058 A1 | * | 10/2018 | Maruyama | B65B 57/10 |

FOREIGN PATENT DOCUMENTS

| | | |
|---|---|---|
| CN | 103327820 A | 9/2013 |
| CN | 103517851 A | 1/2014 |
| CN | 104640455 A | 5/2015 |
| DE | 102011075439 A1 | 11/2012 |
| DE | 102016123564 A1 | 6/2018 |
| EP | 0335003 A1 | 10/1989 |
| EP | 1352835 A2 | 10/2003 |
| EP | 2258200 A3 | 12/2010 |
| EP | 2478771 A1 | 7/2012 |
| JP | H0232915 A | 2/1990 |
| JP | 2006076601 A | 3/2006 |
| JP | 2012532610 A | 12/2012 |
| JP | 2017221208 A | 12/2017 |
| JP | 2017221996 A | 12/2017 |
| RU | 2407510 C2 | 12/2010 |
| RU | 2424958 C2 | 7/2011 |
| WO | 0219835 A1 | 3/2002 |
| WO | 2008003083 A2 | 1/2008 |
| WO | 2011038101 A1 | 3/2011 |
| WO | 2014164833 A1 | 10/2014 |

OTHER PUBLICATIONS

Written Opinion of the International Searching Authority; International Application No. PCT/US2019/012342; International Filing Date: Jan. 4, 2019; dated Jun. 4, 2019; 7 pages.
Russian Office Action; International Application No. 2020120095; International Filing Date: Jan. 4, 2019; dated Dec. 30, 2020; 10 pages with translation.
Australian Office Action; Australian Application No. 2019205930; dated Feb. 1, 2022; 3 pages.
Australian Office Action; Australian Application No. 2019205930; dated Feb. 25, 2021; 6 pages.
Canadian Office Action; Canadian Application No. 3085479; dated Jul. 30, 2021; 4 pages.
Canadian Office Action; Canadian Application No. 3085479; dated Mar. 15, 2022; 4 pages.
Chinese Office Action with English Translation; Notice of the First OA; CN Application No. 201980006342.5; dated Apr. 21, 2021; pp. 1-17.
Chinese Office Action; Chinese Application No. 201980006342.5; dated Dec. 6, 2021; pp. 1-4.
Chinese Office Action; Chinese Application No. 201980006342.5; dated Jun. 28, 2022; pp. 1-3.
Chinese Office Action; Chinese Application No. 201980006342.5; dated Mar. 30, 2022; pp. 1-4.
European Office Action; European Application No. 19705418.2; dated Jul. 1, 2022; 4 pages.
European Office Action; European Application No. 19705418.2; dated Jul. 23, 2021; 5 pages.
European Office Action; European Application No. 21165500.6; dated Jul. 11, 2022; 4 pages.
European Office Action; European Application No. 21165506.3; dated Jul. 11, 2022; 4 pages.
European Office Action; European Application No. 21165509.7; dated Jul. 13, 2022; 4 pages.
European Search Report; European Application No. 21165500.6; dated Jun. 28, 2021; 9 pages.
European Search Report; European Application No. 21165506.3; dated Jun. 24, 2021; 7 pages.
Extended European Search Report; European Application No. 21165509.7; dated Jun. 25, 2021; 7 pages.
Indian Office Action; Indian Application No. 202047027938; dated Apr. 28, 2021; 6 pages.
Japanese Office Action with English Translation; Notice of Reasons for Rufusal; JP Application No. 2020-532794; dated Jun. 17, 2021; pp. 1-10.
Japanese Office Action; Japanese Application No. 2020-532794; dated Jan. 18, 2022; 10 pages.
Canadian Office Action; Canadian Application No. 3140799; dated Sep. 14, 2022; 4 pages.
Japanese Office Action; Japanese Application No. 2020-532794; dated Sep. 14, 2022; 5 pages.
Brazilian Office Action for Brazilian Application No. BR112020012863-5; Report dated Jan. 5, 2023 (6 pages).
Canadian Office Action for Canadian Application No. 3140799; Report dated Feb. 15, 2023 (4 pages).
European Office Action issued for European Application No. 19 705 418.2; Report dated Jan. 31, 2023 (4 pages).

(56) References Cited

OTHER PUBLICATIONS

Japanese Office Action for Japanese Application No. 2022-113067; Report dated Dec. 28, 2022 (3 pages).
Canadian Office Action for Canadian Application No. 3085479; Report dated Nov. 29, 2022 (4 pages).
Australian Office Action for Australian Application No. 2021286425; Report dated Apr. 20, 2023 (5 Pages).
Australian Office Action for Australian Application No. 2022201321; Report dated Apr. 20, 2023 (3 Pages).
Canadian Office Action for Canadian Application No. 3,085,479; Report dated Aug. 7, 2023 (4 Pages).
Canadian Office Action for Canadian Application No. 3,140,799; Report dated May 25, 2023 (3 Pages).
Japanese Office Action with English Translation; Notice of Reasons for Refusal; JP Application No. 2022-113067; Report dated Aug. 9, 2023 (2 Pages).
European Notice of Intent to Grant for European Application No. 21165506.3; Report dated Oct. 11, 2023 (8 Pages).

* cited by examiner

PACKAGING A COMESTIBLE WITHOUT CONDITIONING

CROSS REFERENCE TO RELATED APPLICATIONS

This application is a National Stage application of PCT/US2019/012342, filed Jan. 4, 2019, which claims the benefit of U.S. Provisional Application No. 62/614,053, filed Jan. 5, 2018, both of which are incorporated by reference in its entirety herein.

FIELD

The present invention relates to comestible manufacturing methods and systems and more particularly, to a method and system for packaging a comestible directly after forming and sizing a comestible.

BACKGROUND

Typically, the process of making and packaging comestibles, such as a confection or chewing gum, is time-consuming and involves a significant amount of machinery. For example, the process of making and packing gum products can include mixing and producing a finished gum as a non-uniform output, extruding and forming the finished gum into loaves, conditioning the loaves of the finished gum, extruding the loaves into a continuous thin sheet of the finished gum, rolling the continuous sheet through a series of rollers to a uniform reduced thickness, scoring and dividing sheets into individual scored sheets, conditioning the individual sheets in a conditioning room, dividing sheets into gum pieces, and packaging the gum pieces. Such processes of making and packaging gum products are disclosed in U.S. Pat. No. 6,254,373 assigned to the predecessor of interest of the present assignee, and U.S. patent application Ser. No. 12/352,110 assigned to the present assignee; the teachings and disclosures of which are hereby incorporated by reference in their entireties to the extent not inconsistent with the present disclosure.

A confection is typically conditioned after being formed into a desired size and shape prior to being packaged to increase the hardness of the confection and make the confection less susceptible to damage during later processing. Conditioning typically involves removing the confection from the manufacturing line and allowing the confection to remain within a room having a desired temperature and humidity for a given period of time below room temperature, such as around 10° C. This interruption in the manufacturing process increases the overall time to manufacture a confection and requires manual labor for moving confection to and from the manufacturing line, thereby reducing the manufacturing efficiency. Further, because the manufacturing system is prevented from being an "in-line" system, both additional time and space are required to manufacture a comestible.

BRIEF SUMMARY

According to an embodiment, a method of manufacturing a comestible includes providing a comestible mass, forming said comestible mass into a comestible structure having a desired shape using a forming station, and applying a packaging material to a surface of said comestible structure while said comestible structure remains in contact with a portion of said forming station.

In addition to one or more of the features described above, or as an alternative, in further embodiments said forming station includes at least one roller having a plurality of cavities formed about a periphery of said at least one roller, said roller being said portion of said forming station with which said comestible structure remains in contact.

In addition to one or more of the features described above, or as an alternative, in further embodiments forming said comestible mass into a comestible structure having a desired shape includes forcing said comestible mass into said plurality of cavities.

In addition to one or more of the features described above, or as an alternative, in further embodiments each of said plurality of cavities defines at least at portion of said desired shape.

In addition to one or more of the features described above, or as an alternative, in further embodiments said plurality of cavities define a plurality of different shapes.

In addition to one or more of the features described above, or as an alternative, in further embodiments each of said plurality of cavities is associated with a comestible.

In addition to one or more of the features described above, or as an alternative, in further embodiments each of said plurality of cavities is associated with a plurality of pieces of comestible.

In addition to one or more of the features described above, or as an alternative, in further embodiments applying said packaging material to said comestible structure includes placing said packaging material between a first packaging roller and at least one roller of said forming station.

In addition to one or more of the features described above, or as an alternative, in further embodiments comprising removing said comestible structure from at least one roller of said forming station.

In addition to one or more of the features described above, or as an alternative, in further embodiments removing said comestible structure from said at least one roller occurs via an affinity of said comestible structure for said packaging material that is greater than an affinity of said comestible structure for a surface of said at least one roller as said at least one roller rotates about an axis.

In addition to one or more of the features described above, or as an alternative, in further embodiments comprising applying another packaging material to another surface of said comestible structure.

In addition to one or more of the features described above, or as an alternative, in further embodiments said another surface is opposite said surface of said comestible structure.

In addition to one or more of the features described above, or as an alternative, in further embodiments comprising: cutting said packaging material and said another packaging material adjacent said comestible structure; and sealing said packaging material to said another packaging material to substantially enclose said comestible structure.

In addition to one or more of the features described above, or as an alternative, in further embodiments said sealing said packaging material to said another packaging material to substantially enclose said comestible structure occurs within five minutes of said forming.

In addition to one or more of the features described above, or as an alternative, in further embodiments said sealing said packaging material to said another packaging material to substantially enclose said comestible structure occurs within 1 minute of said forming.

In addition to one or more of the features described above, or as an alternative, in further embodiments said sealing said packaging material to said another packaging material to substantially enclose said comestible structure occurs within 30 seconds of said forming.

In addition to one or more of the features described above, or as an alternative, in further embodiments a temperature of said substantially enclosed comestible is within 10° C. of a temperature of said comestible mass during said forming.

In addition to one or more of the features described above, or as an alternative, in further embodiments said sealing said packaging material to said another packaging material to substantially enclose said comestible structure occurs before said comestibles structure reaches an ambient temperature.

In addition to one or more of the features described above, or as an alternative, in further embodiments the comestible is a chewing gum.

In addition to one or more of the features described above, or as an alternative, in further embodiments the comestible has a Young's Modulus between 75 kP and 120 kP.

In addition to one or more of the features described above, or as an alternative, in further embodiments the comestible has a Young's Modulus between 20 kP and 80 kP.

In addition to one or more of the features described above, or as an alternative, in further embodiments the comestible has a Young's Modulus between 30 kP and 70 kP.

In addition to one or more of the features described above, or as an alternative, in further embodiments comestible has a Young's Modulus between 40 kP and 60 kP.

In addition to one or more of the features described above, or as an alternative, in further embodiments said forming said comestible mass into a comestible structure having a desired shape using a forming station occurs by applying a pressure to said comestible mass.

In addition to one or more of the features described above, or as an alternative, in further embodiments the comestible is at least one of chocolate, gummy candy, soft candy, and a biscuit.

In addition to one or more of the features described above, or as an alternative, in further embodiments no intentional cooling of said comestible structure occurs during said forming said comestible into a comestible structure having a desired shape and said applying a packaging material to a surface of said comestible.

In addition to one or more of the features described above, or as an alternative, in further embodiments, said forming station includes a chain cutter apparatus.

According to another embodiment, a system for forming and packaging a comestible along a forming and packaging line, the system including a forming station positioned along the forming and packaging line for receiving a comestible and forming and sizing said comestible into a comestible structure having a desired shape. A packaging material is receivable by the forming and packaging line. The packaging material is positioned in contact with said comestible structure while said comestible structure is in contact with said forming station.

In addition to one or more of the features described above, or as an alternative, in further embodiments said forming station includes at least one component and said at least one component includes a plurality of cavities for receiving said comestible.

In addition to one or more of the features described above, or as an alternative, in further embodiments within said plurality of cavities said comestible is formed at least partially into said desired shape.

In addition to one or more of the features described above, or as an alternative, in further embodiments said comestible is formed at least partially into said desired shape by a scraping knife cooperating with said at least one component.

In addition to one or more of the features described above, or as an alternative, in further embodiments said at least one component includes a first roller and a second roller, said first roller having a generally smooth surface.

In addition to one or more of the features described above, or as an alternative, in further embodiments said at least one component includes a first roller and a second roller, said first roller including a plurality of first cavities and said second roller including a plurality of second cavities.

In addition to one or more of the features described above, or as an alternative, in further embodiments said plurality of first cavities and said plurality of second cavities cooperate to form and size said comestible into said desired shape.

In addition to one or more of the features described above, or as an alternative, in further embodiments an affinity between said comestible and said plurality of second cavities is greater than an affinity between said comestible and said plurality of first cavities.

In addition to one or more of the features described above, or as an alternative, in further embodiments said at least one roller includes a first roller and a second roller and a gap is defined between said first roller and said second roller, and said comestible structure remains in contact with said second roller downstream from said gap.

In addition to one or more of the features described above, or as an alternative, in further embodiments comprising a blade for removing excess material from a surface of said at least one component.

In addition to one or more of the features described above, or as an alternative, in further embodiments said forming station includes a first roller and a second roller and said packaging roller cooperates with a portion of said second roller at a position downstream from said first roller.

In addition to one or more of the features described above, or as an alternative, in further embodiments an affinity of said comestible structure for said packaging material is greater than an affinity of said comestible structure for said second roller.

In addition to one or more of the features described above, or as an alternative, in further embodiments said packaging station further comprises another packaging roller configured to apply another packaging material to said comestible structure.

In addition to one or more of the features described above, or as an alternative, in further embodiments said another packaging roller is configured to apply said another packaging material to said comestible structure when said comestible structure is separated from said forming station.

In addition to one or more of the features described above, or as an alternative, in further embodiments said packaging station further comprises a packaging machine for sealing said packaging material and said another packaging material about said comestible structure.

In addition to one or more of the features described above, or as an alternative, in further embodiments said packaging station further comprises a cutting device for forming at least one cut in said packaging material.

In addition to one or more of the features described above, or as an alternative, in further embodiments no intentional cooling of said comestible structure occurs downstream of said forming station.

According to another embodiment, a method of manufacturing a comestible includes providing a comestible mass, forming said comestible mass into a comestible structure having a desired shape via a forming station, and packaging said comestible structure in a packaging material. The comestible structure is continuously provided from said forming station directly to said packaging material and/or the packaging material is continuously provided directly to said forming station.

In addition to one or more of the features described above, or as an alternative, in further embodiments said packaging said comestible structure is continuous to fully enclose said comestible structure within said package.

In addition to one or more of the features described above, or as an alternative, in further embodiments said packaging station does not include a holding station.

In addition to one or more of the features described above, or as an alternative, in further embodiments said comestible structure is not accumulated within said packaging station.

In addition to one or more of the features described above, or as an alternative, in further embodiments no or little conditioning of said comestible structure occurs between said forming and said packaging.

In addition to one or more of the features described above, or as an alternative, in further embodiments said forming station includes at least one movable component and said packaging of said comestible structure is initiated while said comestible structure is in contact with said at least one movable component.

In addition to one or more of the features described above, or as an alternative, in further embodiments packaging of said comestible structure further comprises: applying a first packaging material to a first surface of said comestible structure and applying a second packaging material to a second surface of said comestible structure.

In addition to one or more of the features described above, or as an alternative, in further embodiments said forming station includes at least one component and said comestible structure is in contact with said at least one component when said first packaging material is applied to said comestible structure.

In addition to one or more of the features described above, or as an alternative, in further embodiments comprising removing said comestible structure from said at least one component.

In addition to one or more of the features described above, or as an alternative, in further embodiments an affinity for of said comestible structure for said first packaging material is greater than an affinity of said comestible structure for a surface of said at least one component.

In addition to one or more of the features described above, or as an alternative, in further embodiments packaging of said comestible structure further comprises sealing said first packaging material to said second packaging material to enclose said comestible structure.

In addition to one or more of the features described above, or as an alternative, in further embodiments packaging of said comestible structure further comprises cutting at least one of said first packaging material and said second packaging material.

In addition to one or more of the features described above, or as an alternative, in further embodiments no intentional cooling of said comestible structure occurs during said forming said comestible into a comestible structure having a desired shape and said applying a packaging material to a surface of said comestible.

In addition to one or more of the features described above, or as an alternative, in further embodiments said comestible is a chewing gum.

In addition to one or more of the features described above, or as an alternative, in further embodiments said comestible structure is continuously provided from said forming station to a conveyor in communication with a first packaging roller.

In addition to one or more of the features described above, or as an alternative, in further embodiments said forming station includes a chain cutter apparatus.

According to another embodiment, a system for forming and packaging a comestible along a forming and packaging line includes a forming station positioned along the forming and packaging line for receiving a comestible and forming and sizing said comestible into a comestible structure having a desired shape. A packaging material is receivable by the forming and packaging line. The packaging material is positioned such that said comestible structure is continuously provided from said forming station directly to said packaging material.

In addition to one or more of the features described above, or as an alternative, in further embodiments said forming station includes a component having at least one cavity for receiving said comestible.

In addition to one or more of the features described above, or as an alternative, in further embodiments said comestible is formed into said desired shape by compression within said at least one cavity.

In addition to one or more of the features described above, or as an alternative, in further embodiments said packaging station includes a packaging roller that applies a packaging material to a surface of said comestible structure.

In addition to one or more of the features described above, or as an alternative, in further embodiments said forming station includes a first roller and a second roller, said packaging cooperates with said second roller at a position downstream from said first roller.

In addition to one or more of the features described above, or as an alternative, in further embodiments said packaging station applies said packaging material to the comestible structure while the comestible is in contact with said forming station.

In addition to one or more of the features described above, or as an alternative, in further embodiments said packaging station further comprises another packaging roller configured to apply another packaging material to said comestible structure.

In addition to one or more of the features described above, or as an alternative, in further embodiments said another packaging roller is configured to apply said another packaging material to said comestible after said comestible is removed from said forming station.

In addition to one or more of the features described above, or as an alternative, in further embodiments said packaging station further comprises a packaging machine for sealing said packaging material and said another packaging material about said comestible structure.

In addition to one or more of the features described above, or as an alternative, in further embodiments said packaging station further comprises a cutting device for forming at least one cut in said packaging material and said another packaging material.

In addition to one or more of the features described above, or as an alternative, in further embodiments no intentional cooling of said comestible structure occurs downstream of said forming station and before said packaging material is arranged in contact with said comestible structure.

According to another embodiment, a method of packaging a comestible includes providing a comestible mass, forming said comestible mass into a comestible structure having a desired shape, and packaging said comestible structure in a packaging material, wherein said comestible structure avoids direct contact with a force generating component of said packaging station during application of said packaging material.

In addition to one or more of the features described above, or as an alternative, in further embodiments said force generating component includes a knife.

In addition to one or more of the features described above, or as an alternative, in further embodiments all intentional conditioning of said comestible structure occurs while said comestible structure is in said package.

In addition to one or more of the features described above, or as an alternative, in further embodiments no intentional cooling of said comestible structure occurs during said forming said comestible into a comestible structure having a desired shape and said applying a packaging material to a surface of said comestible.

In addition to one or more of the features described above, or as an alternative, in further embodiments said desired shape is a final shape of the comestible.

According to another embodiment, a method of packaging a comestible includes providing a comestible mass, forming said comestible mass into a comestible structure having a desired shape, and packaging said comestible structure in a packaging material. Any changes in a characteristic of said comestible structure that occur downstream from said forming occur while said comestible structure is in contact with said packaging material.

In addition to one or more of the features described above, or as an alternative, in further embodiments changes in characteristic include a change in hardness of said comestible structure.

In addition to one or more of the features described above, or as an alternative, in further embodiments said changes in characteristic include a change in stiffness of said comestible structure.

In addition to one or more of the features described above, or as an alternative, in further embodiments said changes in characteristic do not effect said packaging.

According to another embodiment, a system for forming and packaging a comestible along a forming and packaging line includes a forming station for receiving a comestible and forming and sizing said comestible into a comestible structure having a desired shape. A packaging station is arranged downstream from said forming station. Said comestible provided to said packaging station has a Young's Modulus of less than 120 kP.

In addition to one or more of the features described above, or as an alternative, in further embodiments said comestible provided to said packaging station has a Young's Modulus greater than 75 kP.

In addition to one or more of the features described above, or as an alternative, in further embodiments said comestible provided to said packaging station has a Young's Modulus between 20 kP and 80 kP.

In addition to one or more of the features described above, or as an alternative, in further embodiments said comestible has a Young's Modulus between 30 kP and 70 kP.

In addition to one or more of the features described above, or as an alternative, in further embodiments said comestible has a Young's Modulus between 40 kP and 60 kP.

In addition to one or more of the features described above, or as an alternative, in further embodiments said comestible is provided to said packaging station having a temperature greater than 30° C.

According to another embodiment, a method of manufacturing a comestible includes providing a comestible mass, forming said comestible mass into a comestible structure having a desired shape using a forming station, and applying a packaging material to a surface of said comestible. Said forming said comestible mass into said comestible structure and said applying a packaging material to said surface of said comestible occur without any intentional cooling of said comestible mass and said comestible structure.

In addition to one or more of the features described above, or as an alternative, in further embodiments said packaging material is applied to said surface of said comestible while said comestible is in contact with said forming station.

In addition to one or more of the features described above, or as an alternative, in further embodiments in said desired shape, said comestible structure has a depth between 0.3 mm and 10 mm.

According to another embodiment, a comestible includes a chewing gum body formed into a desired shape. The comestible having a hardness below 80 kP.

In addition to one or more of the features described above, or as an alternative, in further embodiments said hardness is between 20 kP and 80 kP.

BRIEF DESCRIPTION OF THE DRAWINGS

The accompanying drawings incorporated in and forming a part of the specification embodies several aspects of the present invention and, together with the description, serve to explain the principles of the invention. In the drawings.

DETAILED DESCRIPTION

Figure 1:
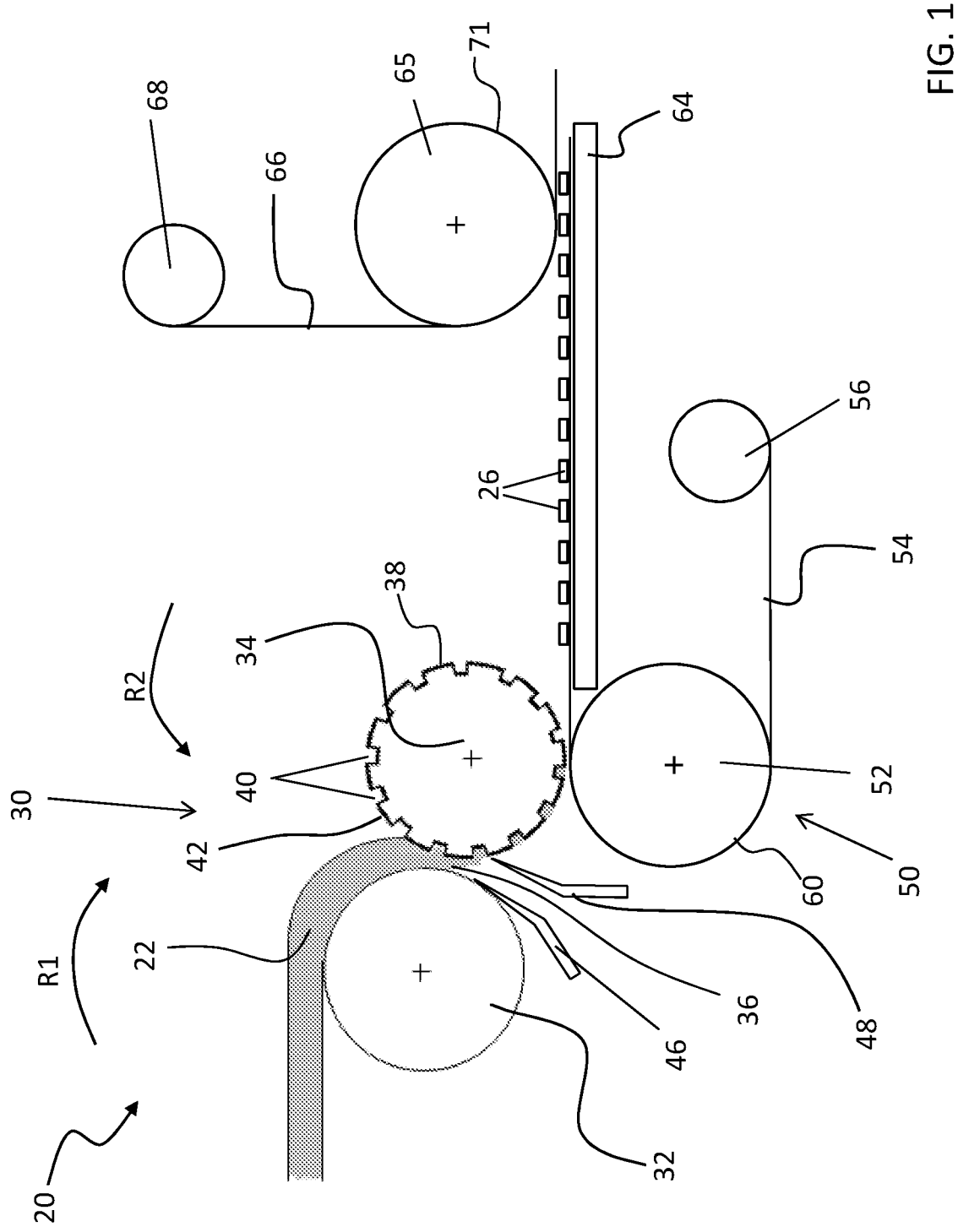
FIG. 1 is a schematic diagram of a forming station and a packaging station of a comestible manufacturing system according to an embodiment.

The comestible discussed herein includes any type of edible product, such as but not limited to chewing gum (at any stage including elastomer, partially finished base, finished chewing gum base, and finished chewing gum), confection (which may be synonymous with chewing gum and candy), chocolate, gummy candy, soft candy, and sweet and savory biscuits. For ease of description, the comestible will be referred to as chewing gum for the remainder of the description. Certain compositions of chewing gum may have a non-uniform texture and/or are multi-layered.

Referring now to the FIGS., a forming station 20 is used during the manufacture of a comestible product. As described herein, the "shaping" that occurs at the forming station 20 may be interpreted to include manipulating or forming a comestible mass 22 into one or more shapes having a desired size. Sizing may occur simultaneously with the shaping. Any forming station 20 capable of performing any type of shaping operation is within the scope of the disclosure. Examples of shaping operations that may be performed by the forming station 20 include, but are not limited to compression, hot stamping, three-dimensional printing, and rotary extrusion forming.

In the illustrated, non-limiting embodiment of FIGS. 1-7, the forming station 20 includes a pair of rollers 30 including a first roller 32 and a second roller 34. However, embodiments where at least one of the rollers is replaced with another component or moving wall, such as a conveyor including a planar surface for example, are also contemplated herein. Each of the rollers 32, 34 may be provided with a motor, such that the rotational speed of each of the rollers 32, 34 is controlled independently. The rotational speed of each of the rollers 32, 34 can be selected depending on physical properties of the comestible mass 22 and an amount of heat transfer desired via the rollers 32, 34.

In one embodiment, the comestible mass 22 provided to the forming station 20 is a finished chewing gum. As is generally well known, a finished chewing gum typically includes a water soluble bulk portion, a water insoluble gum base portion, and one or more flavoring agents. The water soluble portion dissipates over a period of time while the gum base portion is retained in the mouth throughout the chewing process. Further, the comestible mass 22 may include a single composition, or may include multiple compositions, such as layered on top of one another for example.

It should be further understood that the comestible mass 22 may be provided to the forming station 20 in any suitable form. In an embodiment, the comestible mass 22 is in the form of an unshaped comestible mass having an irregular or non-uniform thickness (see FIG. 3). It should be noted that an "unshaped" gum mass may be defined as any mass that is not in its current state, size or formed via extrusion, deforming, or any other means, though the gum mass may have been mixed or formed in such a manner prior to being in this current state. Alternatively, the comestible mass 22 provided to the pair of rollers 30 may be a sheet, slab, continuous ribbon, or rope, having a substantially constant or uniform cross-sectional area over the length of thereof, as shown in FIG. 1. In embodiments where the comestible mass 22 has a uniform shape, the comestible mass 22 may have been sized at a forming station (not shown) located upstream from the forming station 20 via any suitable method. For example, the comestible mass 22 may have been extruded through an extruder die, or alternatively, the comestible mass 22 may be been provided to one or more pairs of sizing rollers. In an embodiment, the pair of rollers 30 of the forming station 20 may also form part of the series of rollers that form a conventional rolling and scoring line for example.

The pair of rollers 30 may be arranged such that the first roller 32 and the second roller 34 are horizontally and/or vertically offset from one another. In an embodiment, the first roller 32 and the second roller 34 are arranged such that a spacing or gap 36 is formed between the rollers 32, 34. In another embodiment, the pair of rollers 30 is positioned such that no gap exists between the first and second rollers 32, 34. In such embodiments, an outer periphery of at least one of the pair of rollers 30 may have a coating formed about an outer surface thereof to minimize the friction and wear resulting from engagement of the rollers 32, 34.

The first roller 32 and second roller 34 are configured to counter rotate to pull the comestible mass 22 between the rollers 32, 34, such as though the spacing 36 for example. In the embodiment shown in FIG. 1, the first roller 32 rotates in a clockwise direction, indicated by arrow R1, while the second roller 34 rotates in a counter clockwise direction, indicated by arrow R2. As the comestible mass 22 is fed between the rollers 32, 34, the counter rotating rollers 32, 34, pull the comestible mass 22 between the rollers 32, 34 and apply a compressive force thereto. Accordingly, the forming of the comestible that occurs at the pair of rollers 30 occurs under pressure.

Figure 2:
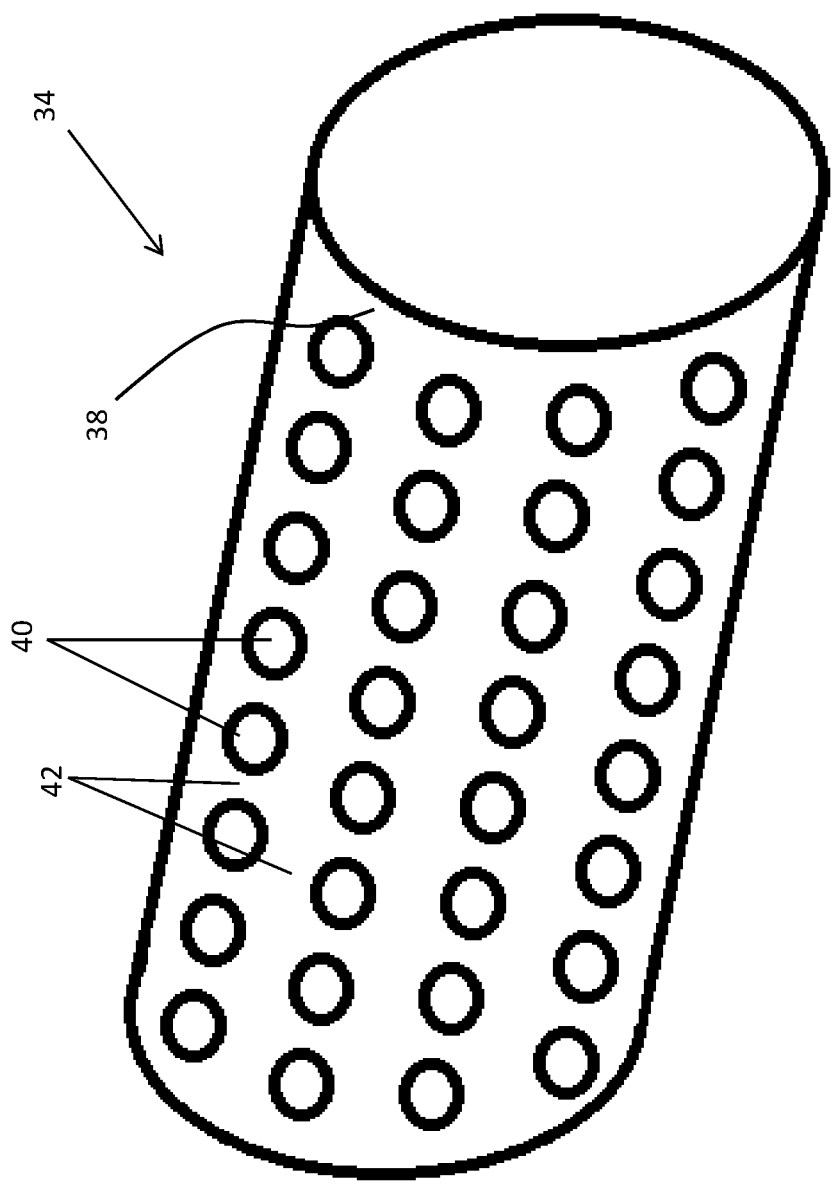
FIG. 2 is a perspective view of an example of a roller of the forming station according to an embodiment.

An example of the second roller 34 of the forming station 20 of FIGS. 1-7 is illustrated in more detail in FIG. 2. In an embodiment, the periphery defining a continuous forming surface 38 of the second roller 34 has a plurality of cavities 40 extending inwardly into the roller 34. As shown, the cavities 40 are cut out indentations spaced axially (parallel to the rotational axis) and circumferentially about the roller 34. Each of the plurality of cavities 40 may be the same, or may be different. In the illustrated, non-limiting embodiment, the roller 34 has 8 cavities formed across the axial width thereof. However, it should be understood that a roller having any suitable number of cavities is contemplated herein. In an embodiment, the roller 34 may have between 5 and 50 axially spaced cavities 40, and more specifically, between 5 and 40, and between 8 and 30 axially spaced cavities 40. A land 42 is positioned between adjacent cavities 40 in both an axial and circumferential direction. In an embodiment, the size of each cavity 40, i.e. the axial width, the circumferential length, and the depth (measured parallel to the radius) may be generally equal to the size of a finished comestible, such as a single piece of gum or candy for example. Alternatively, a cavity 40 may define a plurality of pieces of comestible by having internal contours that define or delineate between adjacent pieces of comestible therein or define the shape of the comestible.

Further, a portion of the cavities 40, such as the plurality of cavities 40 extending axially within a row over the width of the roller 34, measured perpendicular to the machine direction, may form a pattern associated with a grouped comestible. For example, the pattern defined by a row of cavities 40 may define the plurality of pieces of gum within a pack of gum. Further, in embodiments where the roller 34 includes a plurality of patterns, the patterns may have similar or different configurations.

Figure 3:
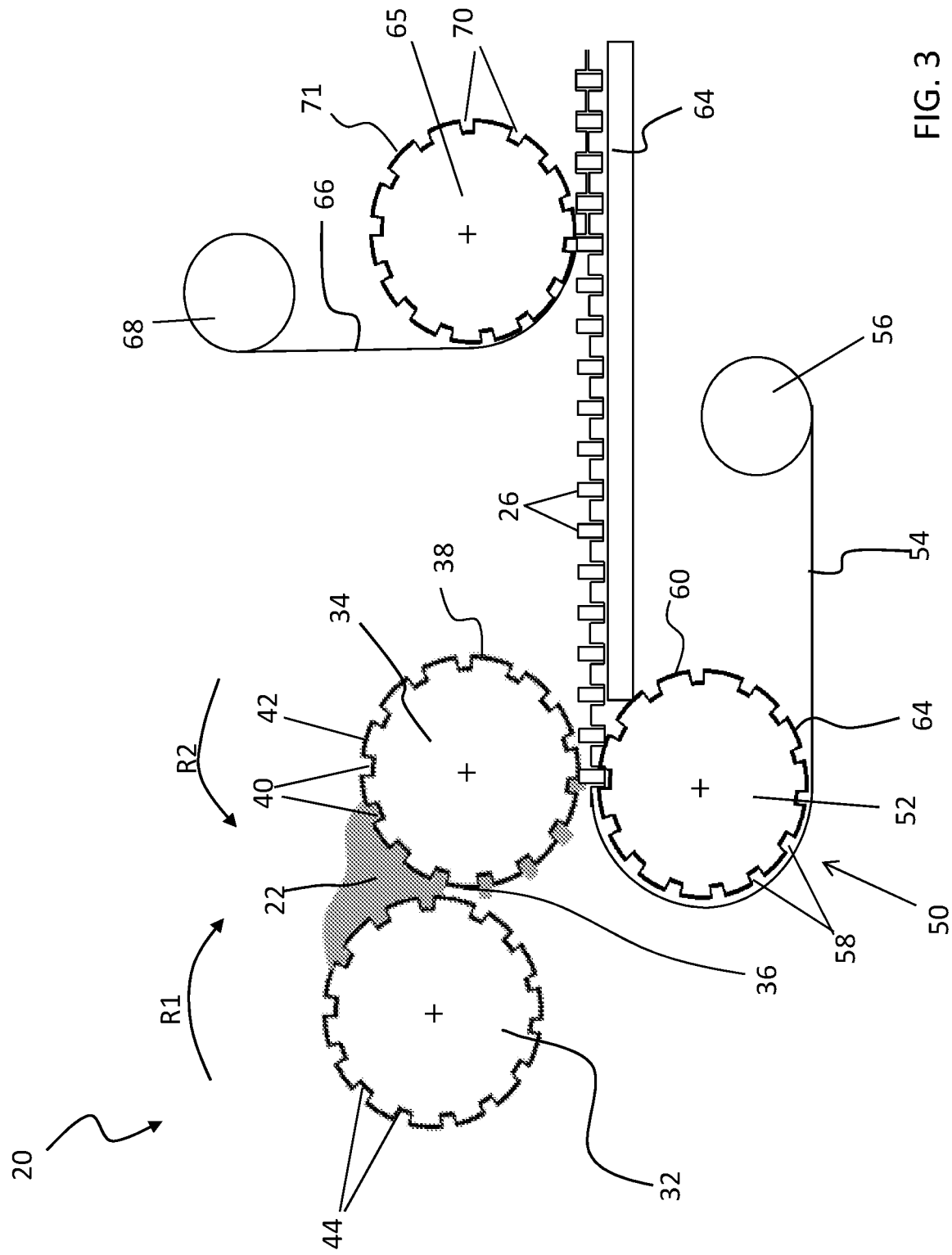
FIG. 3 is a schematic diagram of a forming station and a packaging station of a comestible manufacturing system according to another embodiment.
Figure 4:
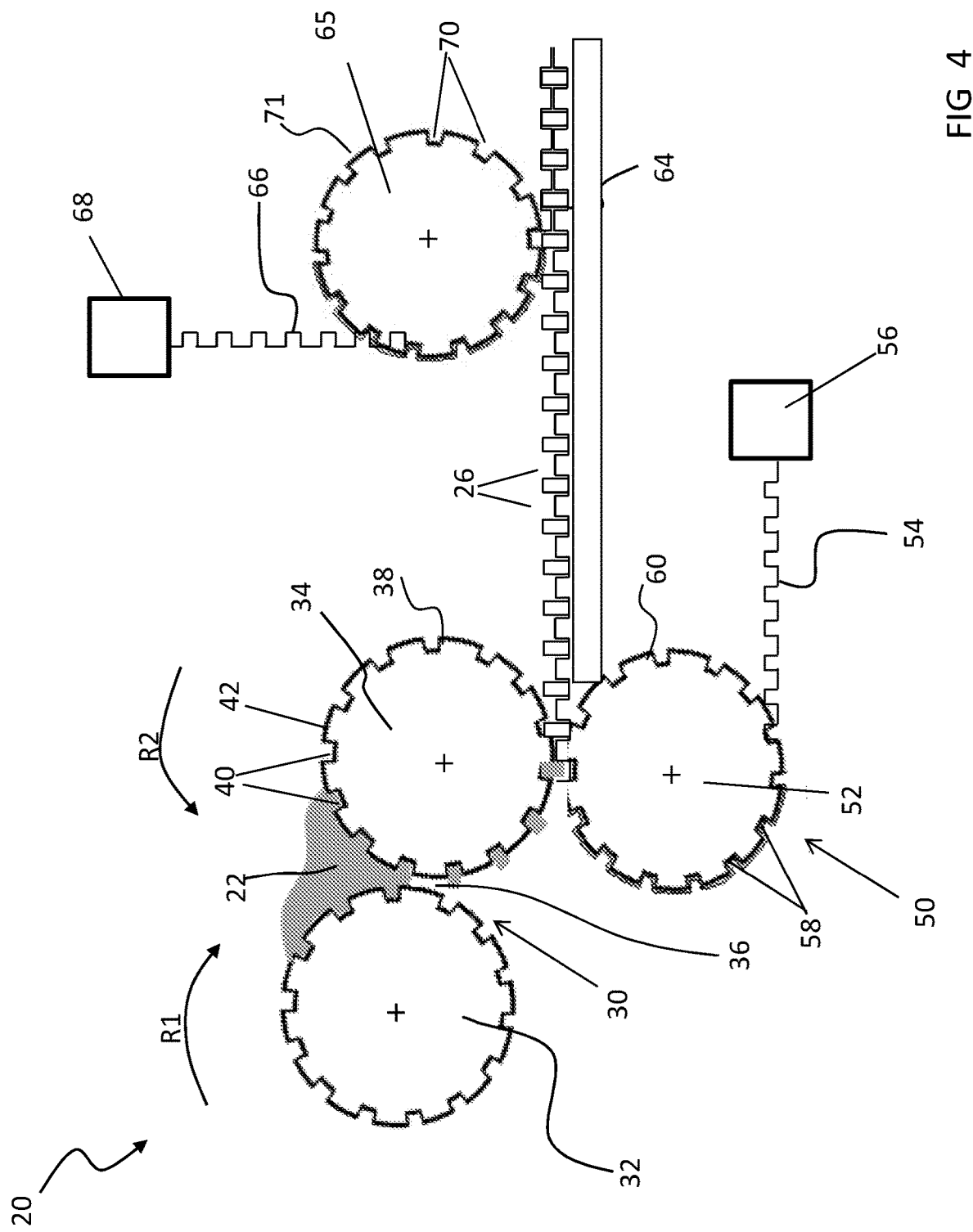
FIG. 4 is a schematic diagram of a forming station and a packaging station of a comestible manufacturing system according to another embodiment.

The first roller 32 may have a generally smooth surface as shown in the FIG. 1. Alternatively, as best shown in FIGS. 3 and 4, the first roller 32 may also have a plurality of cavities 44 or cut out indentations formed into the roller 32. In such embodiments, each of the plurality of cavities 44 is generally complementary to and configured to align with a corresponding cavity 40 formed in the second roller 34 to form a further shaped confection or comestible. Embodiments where both the first roller 32 and the second roller 34 include cavities 40, 44, may be configured to form a three-dimensionally contoured comestible having a complex shape. For example, multiple contoured surfaces of the comestible mass 22 may be formed by each cavity 40, 44.

In an embodiment, a first knife or scraping device 46 is configured to contact a surface of the first roller 32 generally adjacent or downstream from the gap 36, to remove the comestible from the surface of the first roller 32. However, in some embodiments, such as where the gap 36 between first roller 32 and the second roller 34 is very small or no gap exists for example, inclusion of knife 46 may not be necessary. Alternatively, or in addition a second knife or scraping device 48 may be positioned adjacent the outlet of the gap 36. The second knife 48 is configured to abut a surface 38 of the second roller 34 to separate excess compressed material, i.e. the material that is not received within a cavity 40 and/or in some embodiments, material that extends beyond the surface 38 of the second roller 34 toward the first roller 32. The excess material removed by either the first scraping device 46 or the second scraping device 48 may be disposed of or reused by the manufacturing system.

As the comestible mass 22 is compressed between the first roller 32 and the second roller 34, the comestible mass 22 fills the plurality of cavities 40 about the periphery of the second roller 34, and in some embodiments, the plurality of cavities 44 of the first roller 32. Inclusion of the cavities 44 in the first roller 32 and/or the second roller 34 may facilitate movement of the comestible mass 22, such as by pulling the comestible material towards the gap 36. Due to the compressive force used to fill the cavity 40 and/or adhesive characteristics, the comestible mass 22 is retained within the cavities 40 as they rotate away from the gap 36. In embodiments where both the first roller 32 and the second roller 34 have cavities 44, 40, the release characteristics of the first roller 32 may be greater than the release characteristics of the second roller 34. As a result, as the cavities 44, 40 of the first and second roller 32, 34 rotate out of alignment, the shaped comestible or comestible structure 26 is pulled from the cavity 44 by the second roller 34 and remains within cavity 40. In an embodiment, a release agent, such as an oil for example, may be used to reduce or prevent adhesion between the comestible and the cavities 44 of the first roller 32.

After the comestible mass 22 has been compressed into the cavities 40 and/or cavities 44 to form a plurality of shaped comestible structures 26, the comestible structures 26 are then packaged via a packaging station 50 located downstream from and in line with the forming station 20. More specifically, the packaging station 50 is configured to cooperate with at least a portion of the forming station 20. The comestible structures 26 formed by the cavities 40 and/or cavities 44 of the rollers 34, 32 are continuously provided to the packaging station 50 for packaging thereof. As a result, little or no conditioning of the comestible structure 26 occurs between forming and packaging. Further, no intentional conditioning of the comestible occurs between forming and packaging.

In the illustrated, non-limiting embodiment of FIGS. 1 and 3-5, the packaging station 50 is configured to cooperate directly with at least a portion of the forming station 20. As shown, the packaging station 50 includes a first packaging roller 52 disposed adjacent a portion of the second roller 34, downstream from the gap 36 formed with the first roller 32. The first packaging roller 52 is positioned directly adjacent the second roller 34 such that the first packaging roller 52 or a packaging material being moved with the packaging roller 52 contacts the second roller 34. A first packaging material 54 is wrapped at least partially about the first packaging roller 52. In an embodiment, a roll 56 of the first packaging material 54 is in communication with and configured to supply the first packaging material 54 to the first packaging roller 52. Rotation of the first packaging roller 52 may drive rotation of the roll 56 of first packaging material 54, causing the first packaging material 54 to unwind as needed during operation of the system 50. Alternatively, the packaging material may be pulled from the roll 56 as the packaging material 54 is squeezed between the rotating second roller 34 and the first packaging roller 52.

The first packaging material 54 may be any suitable single or multilayer packaging material or composite, including but not limited to a flexible film, such as formed from polyolefins, polyamides, or polyesters for example. In the embodiments shown in FIGS. 1 and 3-5, as the first packaging roller 52 rotates about its axis, the first packaging material 54 is positioned between the first packaging roller 52 and the second roller 34 of the forming station 20. The first packaging material 54 is arranged in direct contact not only with the surface 38 of the second roller 34, but also with a first, lower or bottom surface of the pieces of shaped comestible structure 26 formed within the cavities 40 of the second roller 34.

In embodiments where the first roller 32 includes a plurality of cavities 44, the first packaging roller 52 may similarly include a plurality of cavities 58, substantially identical to the cavities 44 of the first roller 32. As a cavity 40 of the second roller 34 having a comestible structure 26 therein rotates toward the first packaging roller 52, the portion of the comestible structure 26 extending beyond the surface 38 of the second roller 34 is received within a cavity 58 formed in the first packaging roller 52. As the comestible structure 26 extending beyond the surface 38 of the second roller 34 is received within a cavity 58 of the first packaging roller, the comestible structure 26 may force the first packaging material 54 into the cavity 58, at a position between the surface of the cavity 58 and the comestible structure 26.

The first packaging material 54 may be disposed about an outer surface 60 of the first packaging roller 52, as shown in FIG. 3. As the comestible structure 26 is received within a cavity 58, a portion of the first packaging material 54 is similarly received within the cavity 58 between the shaped comestible 26 and the interior surface of the cavity 58. Alternatively, the first packaging material 54 may be generally contoured to form a liner, as shown in FIG. 4, such that the first packaging material 54 is positioned within the cavities 58 of the roller 52 prior to receipt of a shaped comestible structure 26 therein.

The molded comestible structures 26 are configured to wholly separate from the cavities 40 as the second roller 34 rotates away from the interface with the packaging material 54 wrapped about the first packaging roller 52. In an embodiment, the comestibles 26 within the plurality of cavities 40 have a greater affinity for the first packaging material 54 than for the cavity 40. As a result, the adhesion between the first packaging material 54 and the comestible structure 26 pulls the comestible structures 26 from the cavities 40. In an embodiment, the first packaging material 54 has an adhesive applied thereto to couple the pieces of comestible 26 to the material 54.

Figure 6:
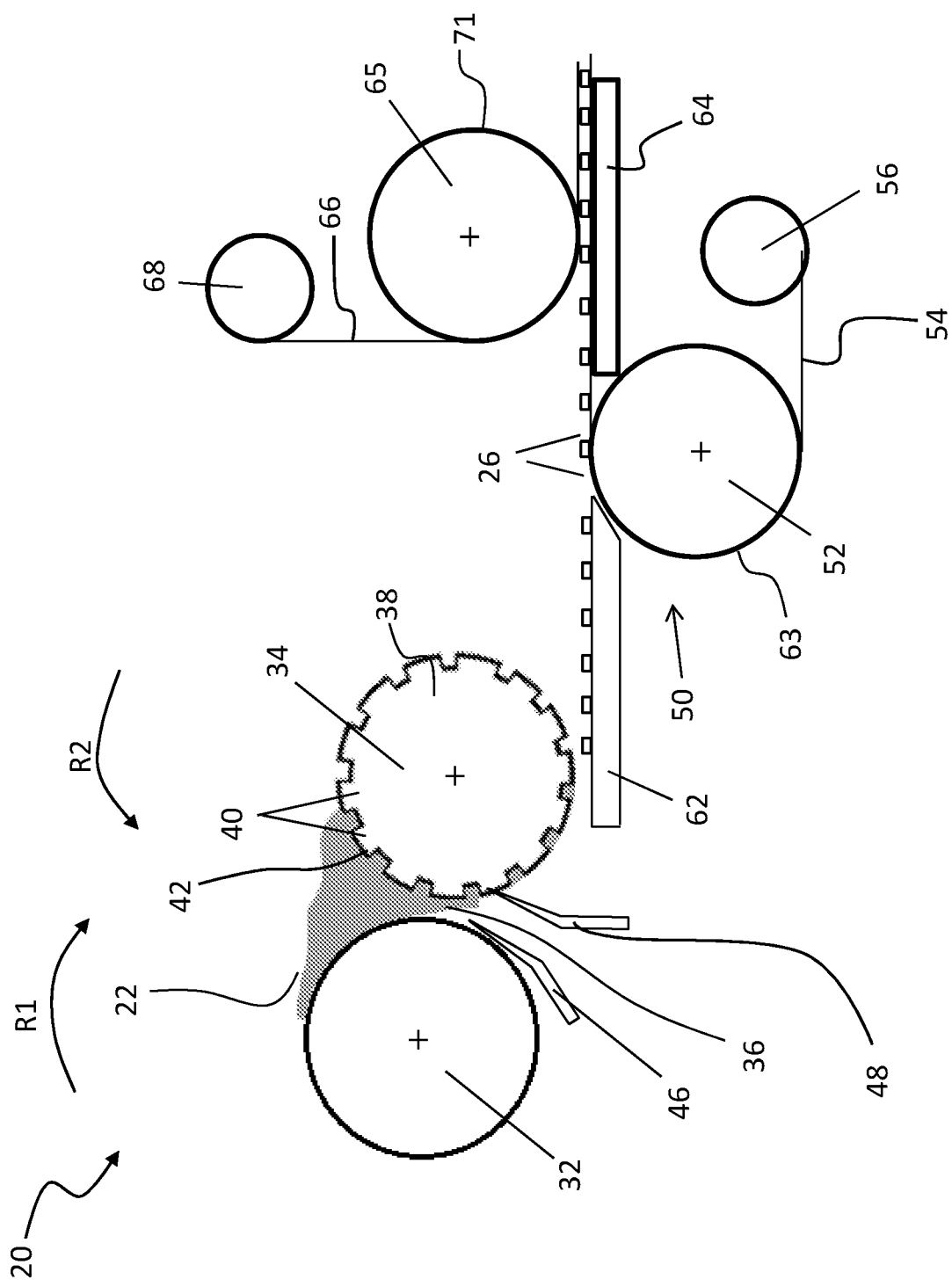
FIG. 6 is a schematic diagram of a forming station and a packaging station of a comestible manufacturing system according to another embodiment.
Figure 7:
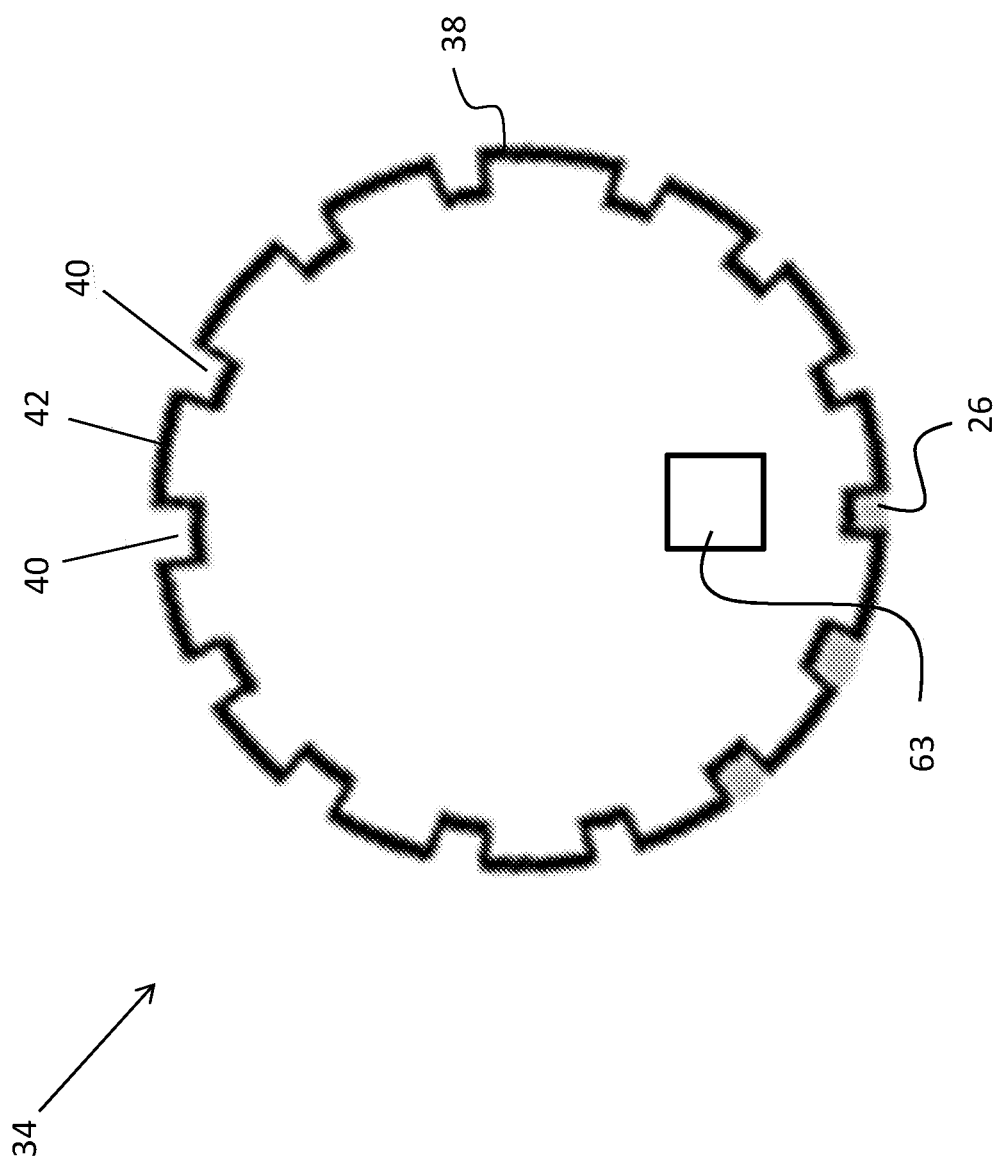
FIG. 7 is a schematic diagram of a mechanism for releasing a comestible from a forming station according to another embodiment.

In another embodiment, the comestible structures 26 may be released from the cavities 40 of the second roller 34 prior to being supplied to the packaging station 50. As shown in FIG. 6, the packaging station 50 includes a first packaging roller 52 and a transport mechanism 62, such as a conveyor for example, for supplying the comestible structures 26 from the forming station 20 to the first packaging roller 52.

In an embodiment, the adhesion between the comestible structure 26 within the cavity 40 and a surface of the transport mechanism 62 may be sufficient to pull the molded comestible structures 26 from the cavities 40 as the second roller 34 rotates away from the interface with the transport mechanism 62. Alternatively, a mechanism 63 associated with the roller 34 may be used to expel the comestible structure 26 from a cavity disposed vertically over the transport mechanism 62. In the illustrated, non-limiting embodiment of FIG. 7, the mechanism 63 is mounted within an interior of the roller 34 and is operable to apply a force to a portion of the comestible structure 26 located within a cavity 40 positioned adjacent the transport mechanism 54. The application of a mechanical, pneumatic, or other suitable force toward the periphery of the roller 34 may cause the comestible structure 26 to disengage or decouple from the cavity 40. Although the mechanism 63 is described with respect to the second roller 34, the mechanism 63 may be adapted for use with any of the rollers of the forming station 20, or alternatively, the packaging station 50. However, it should be understood that the mechanism 63 may also be used to assist with removing the shaped comestible structures 26 from the cavities 40 in embodiments where the comestible structure 26 is output directly onto the packaging material 54.

Regardless of whether the comestible structures 26 are provided to the packaging station 50 directly or indirectly from a roller of the forming station 20, once the comestible structures are separated from the forming station 20 and are in contact with the first packaging material 54, the first packaging material 54 and the comestible structures 26 located thereon are moved via a transport mechanism 64, such as a conveyor for example. The transport mechanism 64 is configured to transport the at least partially packaged comestible structures 26 to a downstream portion of the packaging station 50 to be described in more detail below.

In an embodiment, best shown in FIGS. 1 and 2-4, and 6, the packaging station 50 additionally includes a second packaging roller 65 disposed generally downstream from the first packaging roller 52. The second packaging roller 65 is configured to apply a second packaging material 66 to a second, upper surface of the comestible structure 26. In an embodiment, the lower surface of the comestible structure 26 disposed in contact with the first packaging material 54 and the upper surface of the comestible structure 26 disposed in contact with the second packaging material 66 may be arranged opposite one another.

The second packaging material 66 may be wrapped at least partially about a periphery of the second packaging roller 65 where it is directed into contact with the comestible structure 26. In an embodiment, a roll 68 of second packaging material 66 is arranged in communication with the second packaging roller 65. The second packaging material 66 may also be any suitable material, and may be the same or different from the first packaging material 54.

The second packaging roller 65 may have a generally smooth contour, or alternatively, may include a plurality of cavities 70. The plurality of cavities 70 may be substantially identical to the plurality of cavities 40 formed in the second roller 34. Alternatively, the plurality of cavities 70 may be larger than cavities 40 such that a clearance is formed between the second packaging material 66 and a corresponding portion of the comestible structure 26.

Figure 5:
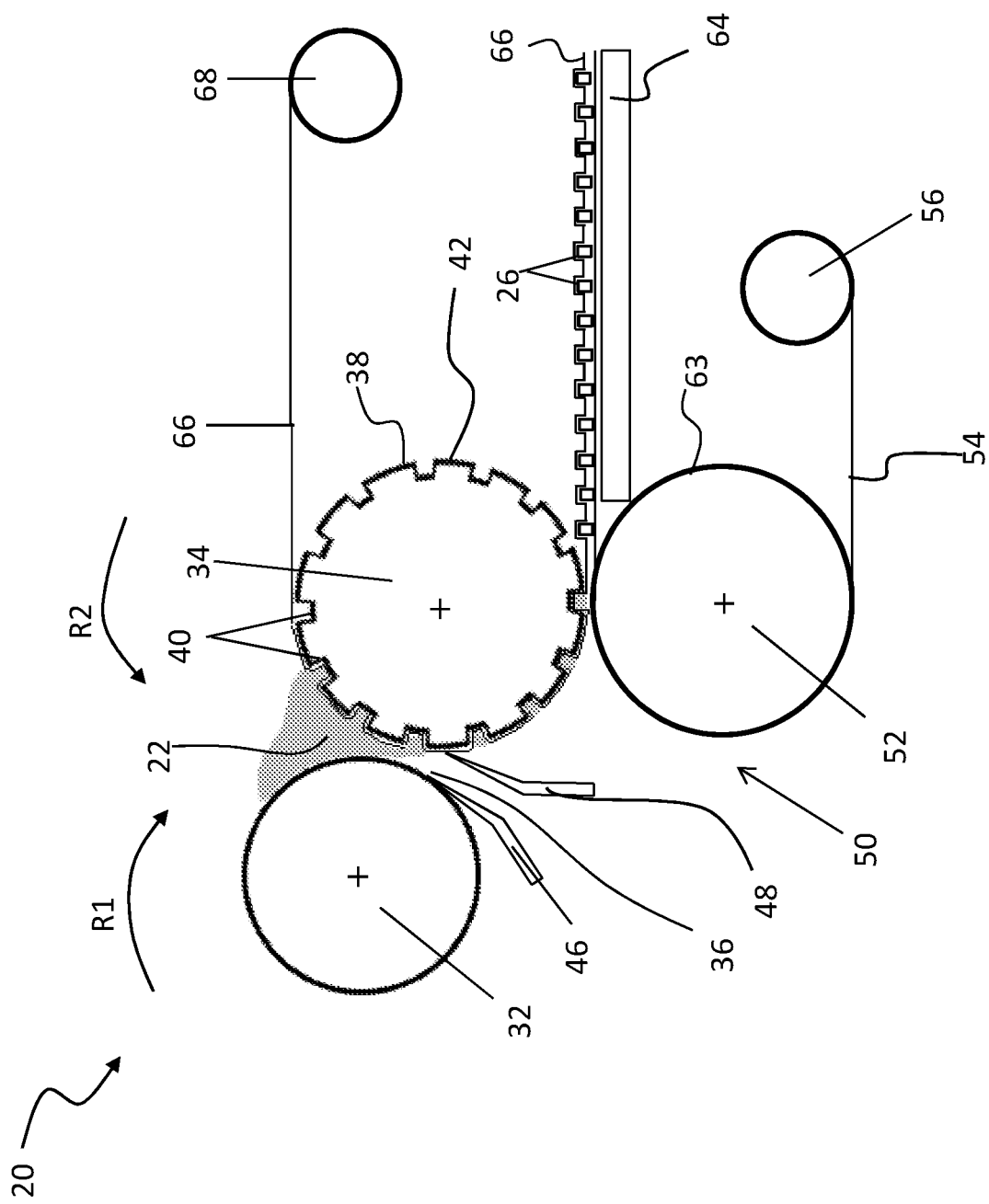
FIG. 5 is a schematic diagram of a forming station and a packaging station of a comestible manufacturing system according to an embodiment.

As the second packaging roller 65 rotates about its axis, the second packaging material 66 is arranged between the second packaging roller 65 and a surface of the comestible 26. The second packaging material 66 may be disposed about an outer surface 71 of the second packaging roller 65, as shown in FIG. 4. As the comestible structure 26 is received within a cavity 70, a portion of the second packaging material 66 is similarly received within the cavity 70 between the shaped comestible 26 and the interior surface of the cavity 70. Alternatively, the second packaging material 66 may be generally contoured to form a liner, as shown in FIG. 5, such that the second packaging material 66 is positioned within the cavities 70 of the roller 64 prior to receipt of a shaped comestible structure 26 therein.

In another embodiment, the second roller 34 of the forming station 20 is used in place of the second packaging roller 65. With reference now to FIG. 5, the second packaging material 66 provided from the roll 68 wraps at least partially about the second roller 34. In the illustrated, non-limiting embodiment, the second packaging material 66 extends about approximately 180 degrees of the periphery of the roller 34. As previously described with respect to the first and second packaging rollers 52, 65, the second packaging material 66 may be disposed about an outer surface 38 of the second roller 34. In such embodiments, the second packaging material 66 is received within a cavity 40 during the compression of the comestible mass 22 between the two rollers 32, 34, at a position between the surface of the cavity 40 and the comestible mass 22. Alternatively, the second packaging material 66 may be generally contoured to form a liner having cavities formed therein that are generally complementary to the cavities 40 of the second roller 34. As the second packaging material 66 is unwound, the cavities of the packaging material 66 are positioned within the cavities 40 of the roller 34 prior to receipt of a shaped comestible structure 26 therein.

In the various configurations of the packaging station 50, the comestible structures 26 are sandwiched between the first packaging material 54 and the second packaging material 66. Because the packaging materials 54, 66 are arranged between the comestible structures 26 and the rollers 52, 65, 34, the comestible structures 26 never directly contact any of the components of the packaging station 50 other than the first and second packaging materials 54, 66.

Figure 8:
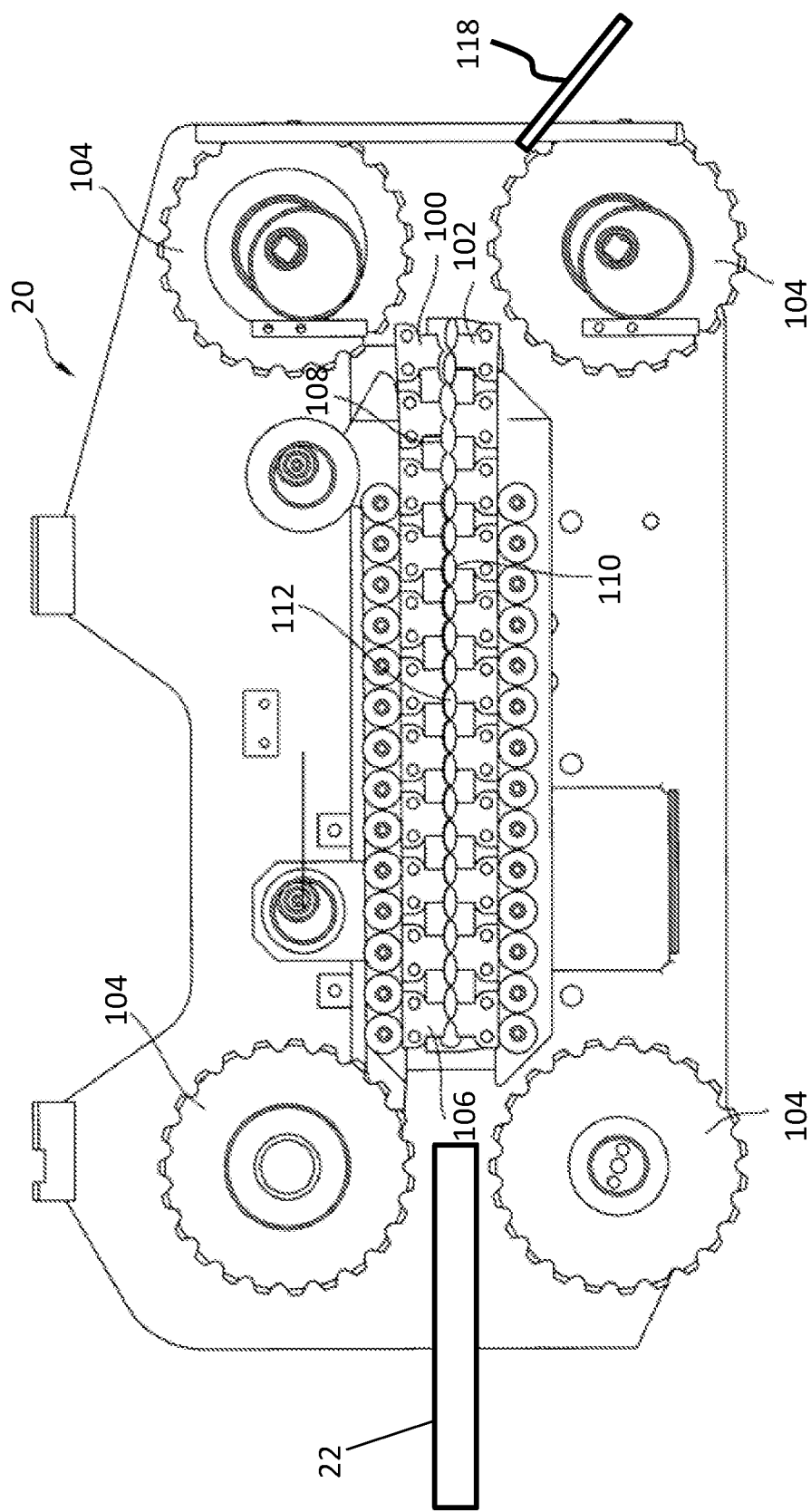
FIG. 8 is a front view of a forming station according to another embodiment.

In another embodiment, best shown in FIG. 8, the forming station 20 includes a chain cutter apparatus. The chain cutter apparatus includes a pair of continuous chains 100, 102. Each chain 100, 102 is supported for continuous rotation about a pair of spaced apart rollers 104. In an embodiment, each chain 100, 102 is configured to rotate at the same speed and is driven by an appropriate motor and gear mechanism (not shown). In an embodiment, the rollers 104 that support the chains 100, 102 include sprocket members to engage and move the chains 100, 102.

In the illustrated, non-limiting embodiment, each chain 100, 102 includes a plurality of die members 106, which define open die cavity portions 108, 110 respectively. The open die cavity portions 108 of the first chain 100 are arranged in alignment with the open die cavity portions 110 of the second chain 102 to form a closed die cavity 112 in which pieces of comestible are formed. However, it should be understood that embodiments where only one of the chains 100, 102 includes open die cavity portions 108, 110, or alternatively, embodiments where the plurality of open die cavity portions 108, 110 of each chain 100, 102 are aligned with a mating flange 114, 116 of the opposite chain 100, 102 are also within the scope of the disclosure. Similar to the previous embodiment, each of the closed die cavities 112 defined between the pair of continuous chains 100, 102 may be the same, or may be different. Further, in an embodiment, the size of each closed die cavity 112 may be generally equal to the size of a finished comestible, such as a single piece of gum or candy for example. Alternatively, a closed die cavity 112 may define a plurality of pieces of comestible by having internal contours that delineate between adjacent pieces of comestible therein or define the shape of the comestible.

A comestible mass 22, such as a finished gum for example, is fed between the open die cavities 108, 110 of the chains 100, 102. In an embodiment, the comestible mass 22 provided to the chain cutter apparatus is an unshaped comestible mass 22 having an irregular or non-uniform thickness. However, in other embodiments, the comestible mass 22 provided to the chain cutter apparatus may have been sized and/or shaped, such as at a forming station (not shown) located upstream from the chain cutter apparatus via any suitable method. For example, the comestible mass 22 provided to the chain cutter apparatus may be a rope having a substantially uniform cross-section over the length (measured parallel to the direction of flow) of the rope. Alternatively, the comestible mass 22 provided to the chain cutter apparatus may be a sheet, slab, or continuous ribbon having a substantially constant or uniform cross-sectional area over the length thereof.

Figure 9:
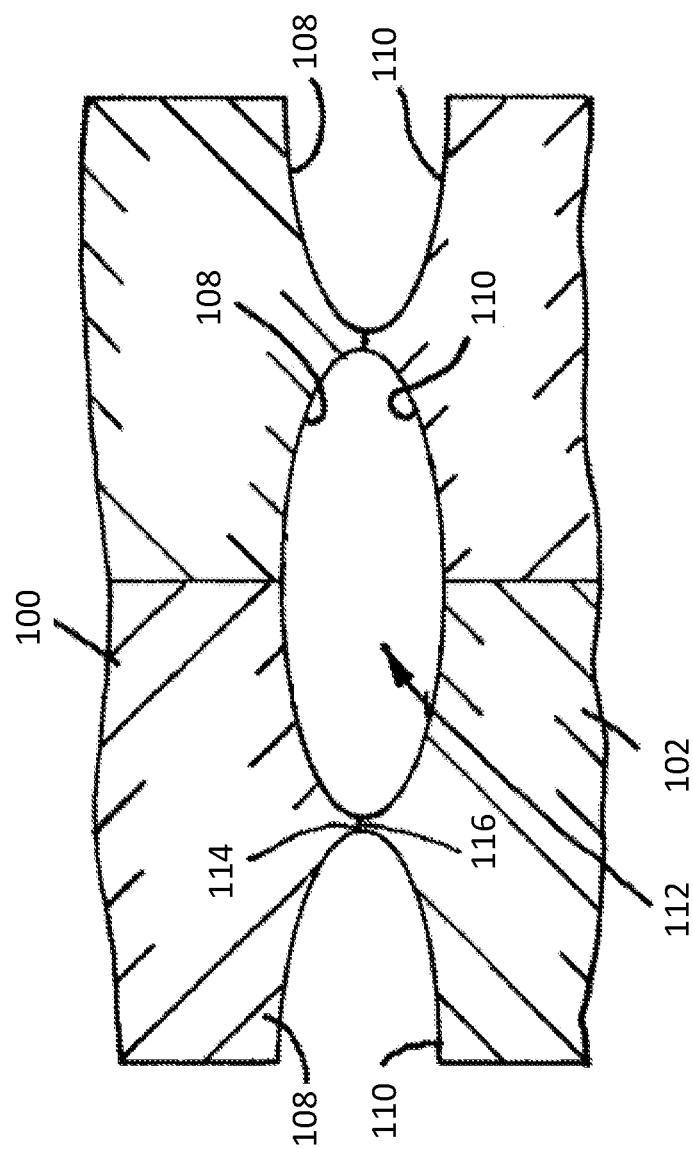
FIG. 9 is a detailed front view of a portion of the forming station of FIG. 8 according to an embodiment.
Figure 10:
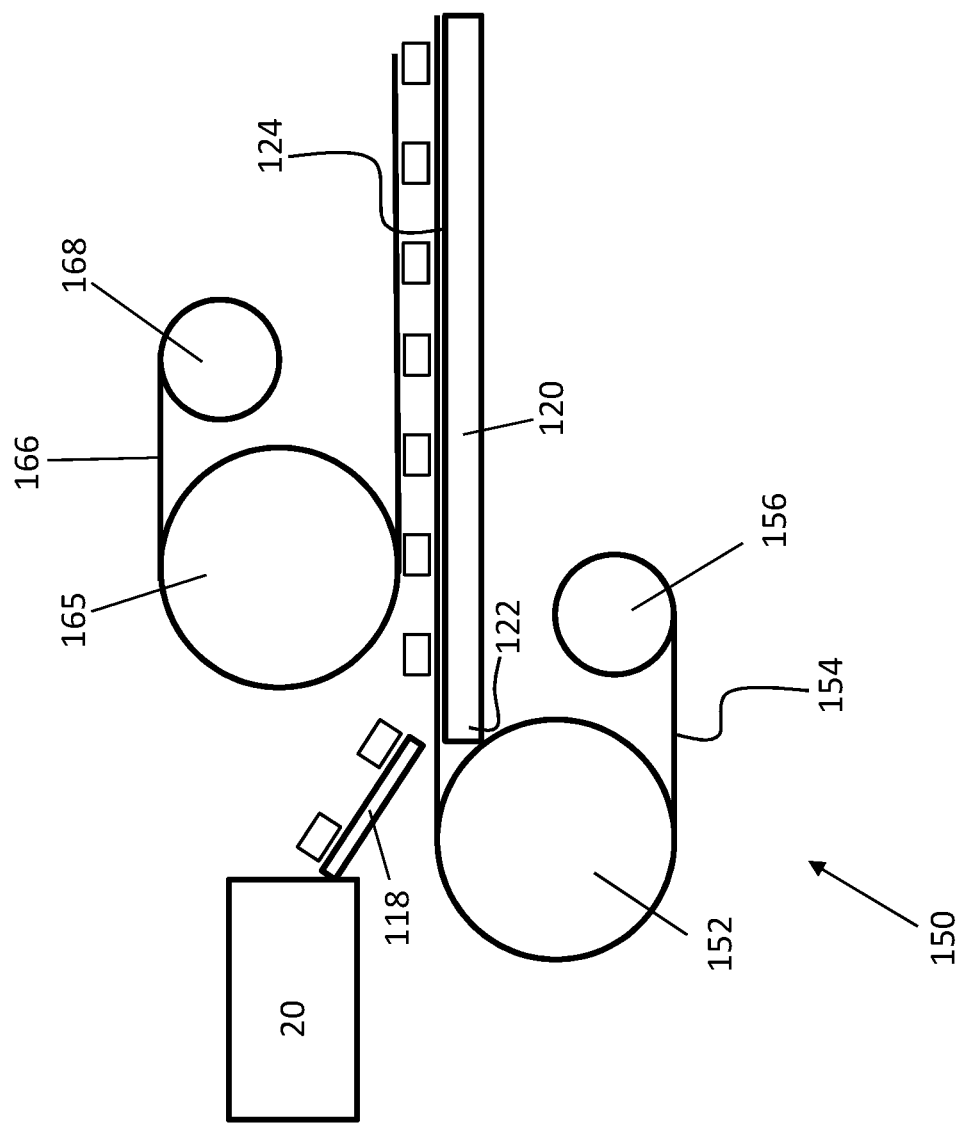
FIG. 10 is a schematic diagram of a forming station and a packaging station of a comestible manufacturing system according to an embodiment.

As best shown in FIG. 9, mating flanges 114, 116 on the chains 100, 102, respectively, are positioned between adjacent open die cavities 108, 110. As the chains 100, 102 move, the mating flanges 114, 116 meet and make contact between each of the die cavities 108, 110. As the mating flanges 114, 116 converge, the die cavity portions 108, 110 close about the comestible mass 22, effectively forming and cutting the comestible mass 22 at those points to form individual pieces of comestible in the closed die cavities 112. Continuing movement of the chains 100, 102 expels the individual pieces from the closed die cavities 112. As the chains 100, 102 separate, such as adjacent the downstream rollers 104 for example, the shaped comestible structures 26 within each closed die cavity 112 will remain within the open die cavities 108, 110 formed in either the upper or lower chain 100, 102. As the open die cavities 110 of the lower chain 102 pass over the roller 104, the shaped comestible structures 26 may be provided to a first transport mechanism, such as a chute or conveyor, illustrated schematically at 118, and onto an adjacent second transport mechanism 120 (see FIG. 10). Similar to the embodiment where the forming station 20 include a pair of rollers, a release agent, such as an oil or powder for example, may, but need not be used to reduce or prevent adhesion between the comestible and the cavities 108,110 of one or both chains 100, 102.

In an embodiment, the first transport mechanism 118 may control, the speed, positioning, or orientation of the comestible structures 26 are they are delivered to the second transport mechanism 120. However, embodiments where the comestible structures 26 are provided directly to the transport mechanism 120 are also contemplated herein.

In embodiments where the forming station 20 includes a chain die cutter, the comestible structures 26 formed by the closed die cavities 112 may be continuously provided to a downstream packaging station 150 for packaging thereof. In such embodiments, little or no conditioning of the comestible structure 26 occurs between forming and packaging. Further, no intentional conditioning of the comestible structure 26 occurs between forming and packaging.

As shown, the packaging station 150 includes a first packaging roller 152 disposed adjacent a transport mechanism 120 configured to receive the plurality of shaped comestible structures 26 output from the forming station 20. In the illustrated, non-limiting embodiment, the first packing roller 152 is disposed adjacent an upstream end 122 of the transport mechanism 120 and may be configured to rotate at the same speed as the transport mechanism 120. A first packaging material 154 is wrapped at least partially about the first packaging roller 152 and is deposited onto an upper surface 124 of the transport mechanism 120. In an embodiment, a roll 156 of the first packaging material 154 is in communication with and configured to supply the first packaging material 154 to the first packaging roller 152. However, embodiments where the roll 156 of first packaging material 154 is integrated into the first packaging roller 152 are also contemplated herein.

Rotation of the first packaging roller 152 may drive rotation of the roll 156 of first packaging material 154, causing the first packaging material 154 to unwind as needed during operation of the packaging station 150. Alternatively, the first packaging material 154 may be pulled from the roll 156 as the packaging material 154 is delivered onto the upper surface 124 of the transport mechanism 120. As previously described, the plurality of shaped comestible structures 26 output from the forming station 20 are provided to the transport mechanism 120 via the chute 118. Because the first packaging material 154 is arranged over the exposed surface 124 of the transport mechanism 120, the shaped comestible structures 26 are deposited onto the transport mechanism 120 with the first packaging material 154 disposed there between. The transport mechanism 120 is configured to transport the at least partially packaged comestible structures 26 to a downstream portion of the packaging station 150.

In an embodiment, the packaging station 150 additionally includes a second packaging roller 165 disposed generally downstream from the first packaging roller 152. In such embodiments, the second packaging roller 165 may be configured to apply a second packaging material 166 to a second, upper surface of the plurality of shaped comestible structures 26. In an embodiment, the lower surface of the comestible structure 26 disposed in contact with the first packaging material 154 and the upper surface of the comestible structure 26 disposed in contact with the second packaging material 166 may be arranged opposite one another.

The second packaging material 166 may be wrapped at least partially about a periphery of the second packaging roller 165 where it is directed into contact with the comestible structures 26. In an embodiment, a roll 168 of second packaging material 166 is arranged in communication with the second packaging roller 165. However, embodiments where the roll 168 of second packaging material 166 is integrated into the second packaging roller 165 are also contemplated herein. The second packaging material 166 may also be any suitable material, and may be the same or different from the first packaging material 154.

The second packaging roller 165 may have a generally smooth contour, as shown in the FIG. 1n such embodiments, as the second packaging roller 165 rotates about its axis, the second packaging material 166 is arranged between the second packaging roller 165 and a surface of the comestible structure 26.

Figure 11:
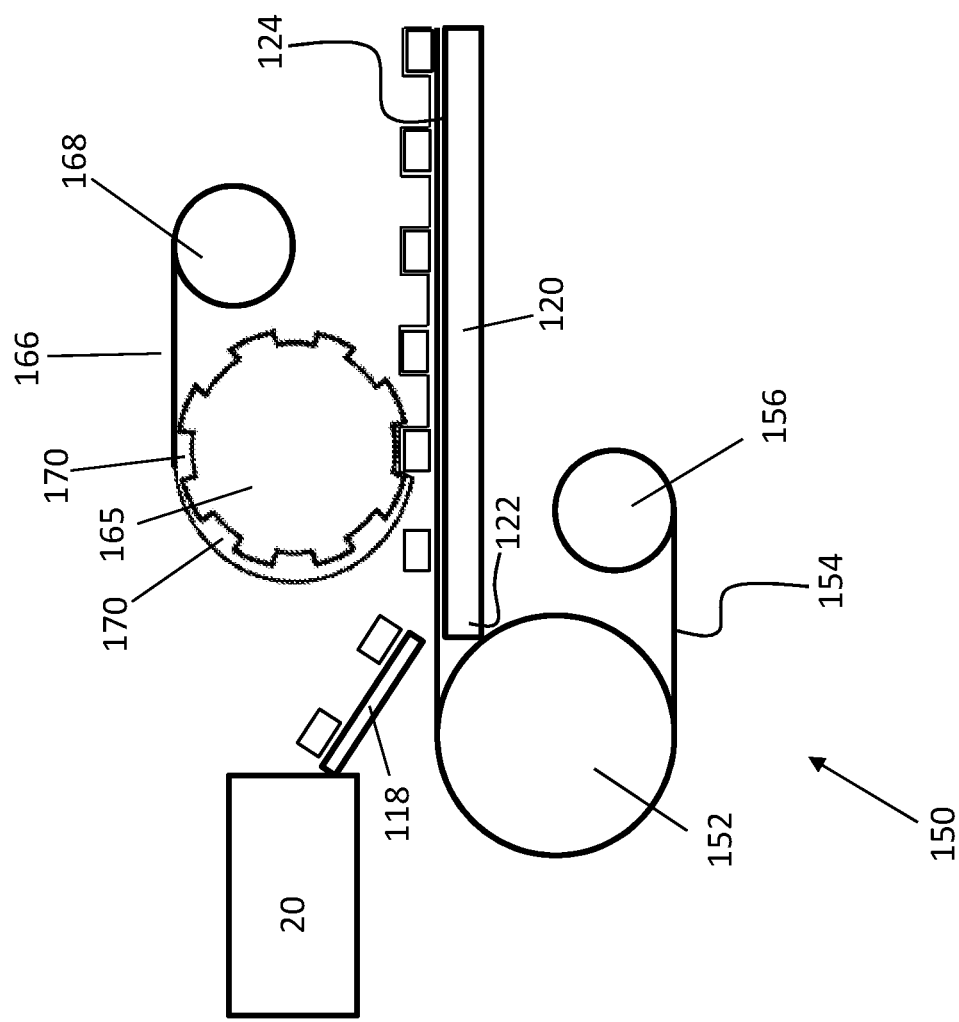
FIG. 11 is a schematic diagram of a forming station and a packaging station of a comestible manufacturing system according to an embodiment.

With reference now to FIG. 11, in another embodiment, the second packaging roller 165 may have a plurality of cavities 170 formed therein. In such embodiments, the plurality of cavities 170 formed in the second packaging roller 165 may be substantially identical to the plurality of open die cavities 108 formed in the first chain 100. Alternatively, the plurality of cavities 170 may be larger than cavities 108 such that a clearance is formed between the second packaging material 166 and a corresponding portion of the comestible structure 26. In such embodiments, as the comestible structure 26 is received within a cavity 170, a portion of the second packaging material 166 is similarly received within the cavity 170 between the shaped comestible 26 and the interior surface of the cavity 170. Alternatively, the second packaging material 166 may be generally contoured to form a liner, such that the second packaging material 166 is positioned within the cavities 170 of the second packaging roller 165 prior to receipt of a shaped comestible structure 26 therein.

Figure 12:
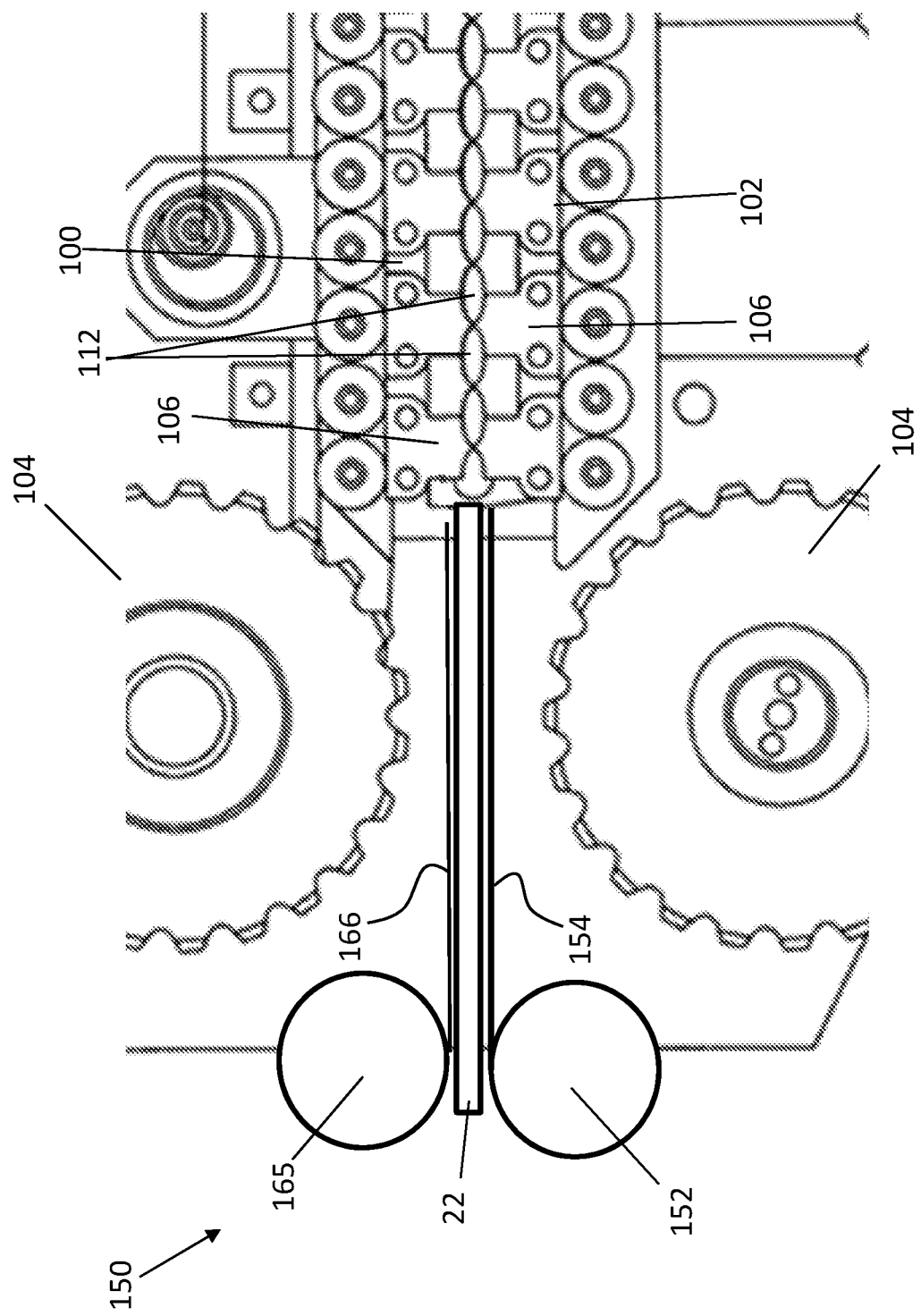
FIG. 12 is a front view of a forming station and a packaging station of a comestible manufacturing system according to an embodiment.

In yet another embodiment, the packaging station 150 may be configured to cooperate directly with the forming station 20. For example, at least one of the first packaging material 154 and the second packaging material 166 may be supplied to the forming apparatus 20 simultaneously with the comestible mass 22. In the non-limiting embodiment illustrated in FIG. 12, the first packaging roller 152 and/or the second packaging roller is disposed adjacent an upstream end of the forming station 20. As the first packaging roller 152 rotates about its axis, the first packaging material 154 is disposed between the die members 106 of the second, lower chain 102 of the forming station 20 and the comestible mass 22. The first packaging material 154 may be arranged in direct contact not only with the surfaces of the die members 106, such as the mating flanges 114 and open die cavities 108, but also with a first, lower or bottom surface of the pieces of shaped comestible structure 26 formed within the cavities 108. Similarly, as the second packaging roller 165 rotates about its axis, the second packaging material 166 is disposed between the die members 106 of the first, upper chain 100 of the forming station 20 and the comestible mass 22. The second packaging material 166 may be arranged in direct contact not only with the surfaces of the die members 106, such as the mating flanges 116 and open die cavities 110, but also with a second, upper surface of the pieces of shaped comestible structure 26 formed within the cavities 110. In such embodiments, the mating flanges 114,116 converge, the die cavity portions 108, 110 close about the comestible mass 22 and the first and/or second packaging materials 154, 166 to effectively form and cut the comestible mass 22 and the packaging material at those points to form at least partially packaged individual pieces of comestible in the closed die cavities 112.

Figure 13A:
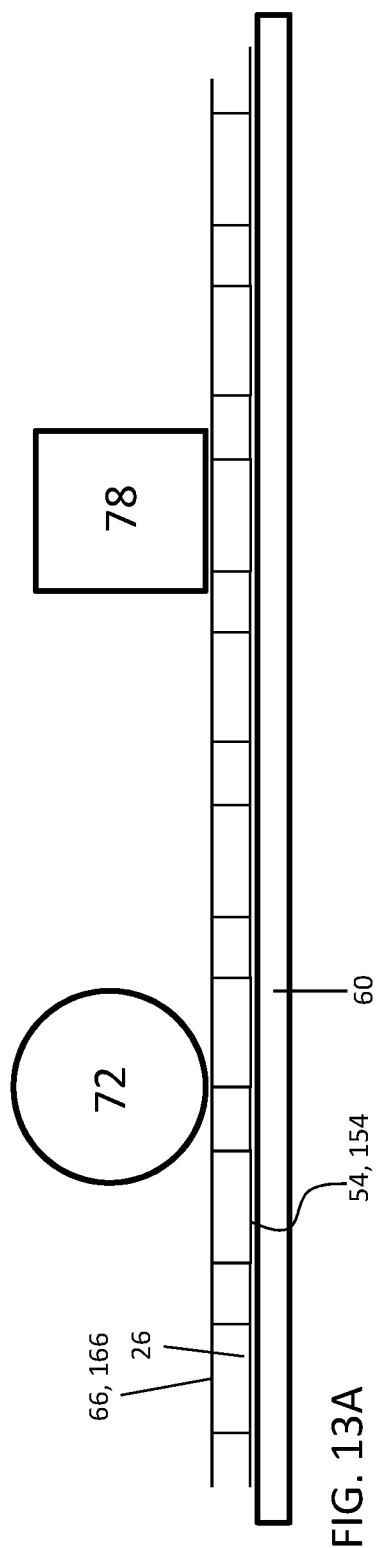
FIG. 13A is a schematic diagram of a portion of the packaging station according to an embodiment.
Figure 13B:
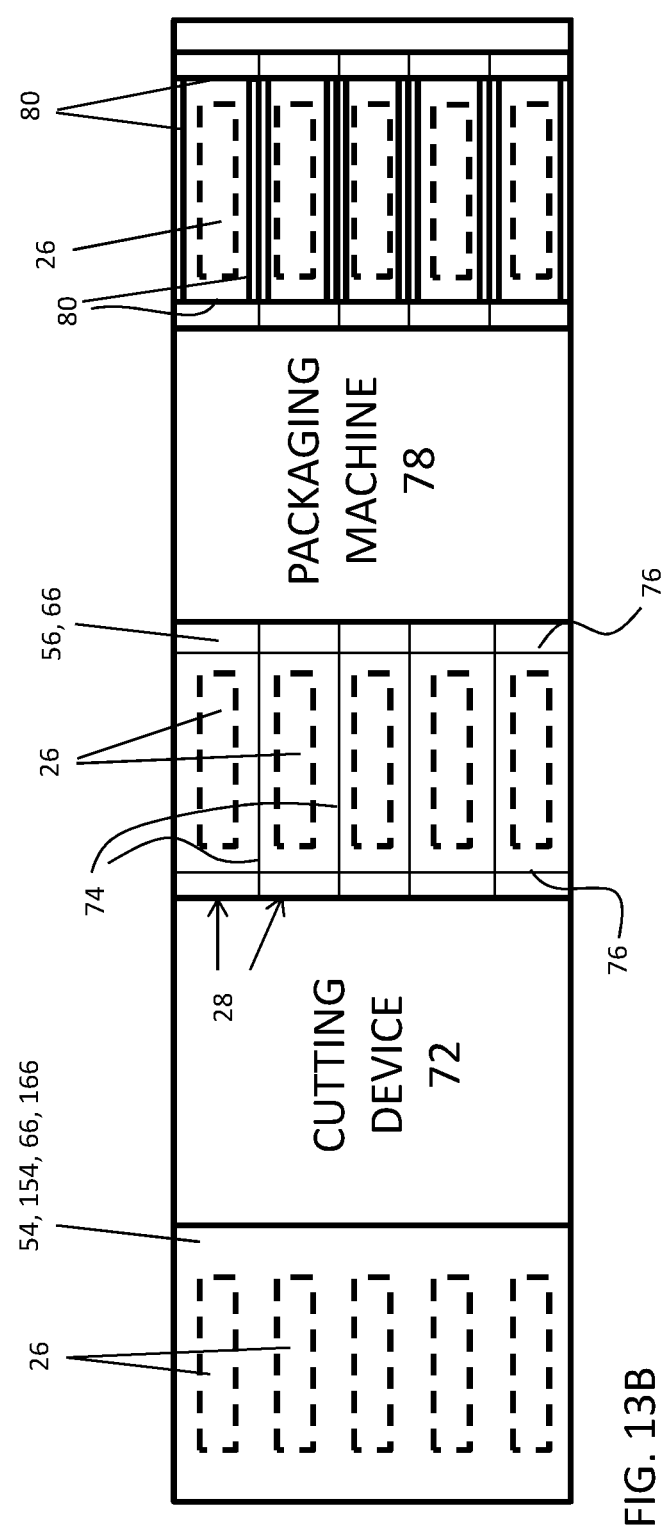
FIG. 13B is a schematic diagram of the comestible and packaging materials within the packaging station according to an embodiment.

With reference now to FIGS. 13A and 13B, in an embodiment, the packaging station 50, 150 additionally includes a cutting device 72, such as a cutting roller for example, configured to cut the first packaging material 54, 154 and the second packaging material 66, 166 at a position between adjacent pieces of comestible, as illustrated schematically at lines 74. Alternatively, or in addition, the cutting device 72 may be configured to cut the first packaging material 54, 154 and the second packaging material 66, 166 between adjacent rows of comestibles, in a direction extending transverse to the machine direction, illustrated schematically at lines 76. Via this cutting operation, the packaging materials 54, 154, 66, 166 and comestible structures 26 may be separated into a plurality of partially packaged individual comestibles 28, or alternatively, into partially packaged groups of comestibles 28. Although referred to as a cutting operation herein, it should be understood that the cutting operation is intended to include any suitable method for dividing the comestible structures 26 into individual comestibles 28 including, but not limited to severing, rupturing, and scoring for example.

The plurality of partially packaged comestibles 28 may be provided to a downstream packaging machine 78 configured to then seal the first packaging material 54, 154 adjacent a first surface of the partially packaged comestible 28 to the second packaging material 66, 166 adjacent a second, opposite surface of the partially packaged comestible 28. In an embodiment, the packaging machine 78 forms a heat seal, illustrated schematically at 80, between the first and second packaging materials 54, 154, 66, 166 along at least one edge of a perimeter of the partially packaged comestible 28. The packaging machine 78 may be configured to seal the first and second packaging materials 54, 154, 66, 166 along a plurality of edges of a perimeter of the partially packaged comestible 28 to substantially enclose the comestible between the first and second packaging materials 54, 154, 66, 166. In an embodiment, the total time elapsed between forming the comestible at the pair of rollers 30 to enclosing the comestible structure 26 within a package may be five minutes or less, three minutes or less, one minute or less, and 30 seconds or less. Although the packaging machine 78 is described as forming a heat seal, embodiments where the packaging machine 78 forms a cold seal, or applies a hot or cold adhesive to seal the packaging materials together to enclose the comestible structure 26 are also within the scope of the disclosure. Further, any type of packaging machine suitable to connect the first and second packaging materials 54, 154, 66, 166 is contemplated herein. Although the packaging station 50 is illustrated and described with the packaging machine 78 being arranged downstream from the cutting device 74, embodiments where the first and second packaging materials 54, 154, 66, 166 are joined prior to or during a cutting operation are also contemplated herein.

Because the first and second packaging materials 54, 154, 66, 166 are applied to opposing surfaces of the comestible structures 26 during or directly after the comestible structures 26 are formed, any and all changes of one or more characteristics of the comestible structure that occur after the comestible is formed, occur while the comestible structures 26 are in contact with at least one packaging material 54, 154 66, 166. For example, all intentional conditioning of the comestible structures 26 downstream from forming may occur while the comestible is in contact with one or more packaging materials 54, 154, 66, 166, or alternatively, within the package defined by the first and second packaging materials 54, 154, 66, 166. As a result, a comestible structure is packaged via the system 10 and process described herein may have a lower stiffness than a comestible formed via a conventional process. For example, the comestible as described herein may have a hardness or Young's Modulus of up to 120 kP, such as between 75 and 120 kP, or between 10 kP and 100 kP and more specifically, between 20 kP and 80 kP for example, which is less than the conventional hardness of about 110 kP for slabs. However, in some embodiments, no intentional conditioning of the comestible structures 26 occurs downstream from the pair of rollers 30. In addition, a temperature of the comestible as it is packaged may be above 30° C., and a coefficient of friction of the comestible may be greater than 0.25. The term "conditioning" as used herein is intended to describe any process where the comestible is located within environment having one or more controlled parameters such that the comestible may attempt to reach one or more optimal characteristics, such as temperature, viscosity, and moisture content, for quality and processing purposes. Further, in some embodiments, conditioning may include intentional cooling of the comestible or comestible structure, such as via controlled convective currents, i.e. from a fan or blower, or via conduction. It should be understood that natural cooling that may occur due to a difference in temperature of the comestible and a temperature of the ambient environment surrounding the comestible is not considered intentional.

Further, the packaging of the comestible structures 26 illustrated and described herein does not require any direct contact between the comestible and a piece of equipment or component that applies force to the comestible. It is this force applying component that necessitates a conditioning period, because without such conditioning, the comestible will stick to and disable the force applying component. Thus elimination of this action eliminates the need for conditioning and permits the production and wrapping of gum with a Young's Modulii different than what was previously possible.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method of manufacturing a comestible, the method comprising:
providing a comestible mass;
forming said comestible mass into a comestible structure having a desired shape using a forming station, wherein said forming includes compressing said comestible mass into said comestible structure with said desired shape; and
applying a packaging material to a surface of said comestible structure while said comestible structure remains in contact with a portion of said forming station, wherein said applying said packaging material occurs after said comestible structure is formed into said desired shape.

2. The method of claim 1, wherein said forming station includes at least one roller having a plurality of cavities formed about a periphery of said at least one roller, said roller being said portion of said forming station with which said comestible structure remains in contact.

3. The method of claim 2, wherein each of said plurality of cavities defines at least a portion of said desired shape.

4. The method of claim 1, wherein applying said packaging material to said comestible structure includes placing said packaging material between a first packaging roller and at least one roller of said forming station.

5. The method of claim 1, further comprising removing said comestible structure from at least one roller of said forming station.

6. The method of claim 1, further comprising applying another packaging material to another surface of said comestible structure.

7. The method of claim 6, further comprising:
cutting said packaging material and said another packaging material adjacent said comestible structure; and
sealing said packaging material to said another packaging material to substantially enclose said comestible structure.

8. The method of claim 1, wherein no intentional cooling of said comestible structure occurs during said forming said comestible into a comestible structure having a desired shape and said applying a packaging material to a surface of said comestible.

9. A system for forming and packaging a comestible along a forming and packaging line, the system comprising:
a forming station positioned along the forming and packaging line for receiving a comestible and compressing said comestible into a comestible structure having a desired shape;
a packaging material receivable by the forming and packaging line, said packaging material being positioned in contact with said comestible structure while said comestible structure is in contact with said forming station, wherein said packaging material is positioned in contact with said comestible structure having said desired shape.

10. The system of claim 9, wherein said forming station includes at least one component including a plurality of cavities for receiving said comestible.

11. The system of claim 9, further comprising a blade for removing excess material from a surface of said at least one component.

12. The system of claim 9, further comprising another packaging material to be applied to said comestible structure.

13. The system of claim 9, further comprising a cutting device for forming at least one cut in said packaging material.

14. The system of claim 9, wherein no intentional cooling of said comestible structure occurs downstream of said forming station and before said packing material is arranged in contact with said comestible structure.

15. A method of manufacturing a comestible, the method comprising:
- providing a comestible mass;
- forming said comestible mass into a comestible structure having a desired shape via a forming station, wherein said forming includes compressing said comestible mass into said comestible structure with said desired shape; and
- packaging said comestible structure in a packaging material, wherein said packaging said comestible structure comprises at least one of continuously providing said comestible structure from a surface of a movable component of said forming station directly to a first packaging material and continuously providing a second packaging material directly to said forming station.

16. The method of claim 15, wherein said packaging said comestible structure is continuous to fully enclose said comestible structure within a package.

17. The method of claim 15, wherein said packaging of said comestible structure is initiated while said comestible structure is in contact with said movable component.

18. The method of claim 15, wherein packaging of said comestible structure further comprises:
- applying said first packaging material to a first surface of said comestible structure; and
- applying said second packaging material to a second surface of said comestible structure.

19. The method of claim 15, wherein no intentional cooling of said comestible structure occurs during said forming said comestible into a comestible structure having a desired shape and said applying a packaging material to said comestible.

* * * * *